United States Patent
Hino et al.

(10) Patent No.: US 7,262,875 B2
(45) Date of Patent: Aug. 28, 2007

(54) DATA COMMUNICATION PROGRAM PRODUCT TRANSMITTING FIRMWARE IN DIVISIONAL MANNER

(75) Inventors: Hideki Hino, Toyokawa (JP); Atsushi Tomita, Toyohashi (JP); Hideo Mae, Toyokawa (JP)

(73) Assignee: Minolta Co., Ltd., Osaka-shi, Osaka (JP)

( * ) Notice: Subject to any disclaimer, the term of this patent is extended or adjusted under 35 U.S.C. 154(b) by 869 days.

(21) Appl. No.: 10/106,031

(22) Filed: Mar. 27, 2002

(65) Prior Publication Data

US 2002/0143884 A1    Oct. 3, 2002

(30) Foreign Application Priority Data

Mar. 30, 2001   (JP) .............................. 2001-098908

(51) Int. Cl.
*G06F 3/12*        (2006.01)
*G06K 1/00*        (2006.01)
(52) U.S. Cl. .................. 358/1.15; 717/169; 709/206; 719/313; 714/748
(58) Field of Classification Search .............. 358/1.15, 358/402; 714/18, 748, 38, 52, 54; 717/168, 717/169, 175; 710/19; 709/203, 206; 719/313; 379/100.08
See application file for complete search history.

(56) References Cited

U.S. PATENT DOCUMENTS

| | | | | |
|---|---|---|---|---|
| 4,638,298 A | * | 1/1987 | Spiro | 370/392 |
| 6,101,548 A | * | 8/2000 | Okada | 709/236 |
| 6,357,021 B1 | * | 3/2002 | Kitagawa et al. | 714/41 |
| 2001/0003827 A1 | * | 6/2001 | Shimamura | 709/206 |
| 2004/0150851 A1 | * | 8/2004 | Sato | 358/1.13 |

FOREIGN PATENT DOCUMENTS

| JP | 5-67009 | 3/1993 |
|---|---|---|
| JP | 9-146859 | 6/1997 |
| JP | 10-187457 | 7/1998 |
| JP | 11-3223 | 1/1999 |
| JP | 11-17872 | 1/1999 |
| JP | 11-284788 | 10/1999 |
| JP | 11-306024 | 11/1999 |
| JP | 2000-029648 | 1/2000 |
| JP | 2000-224223 | 8/2000 |
| JP | 2000-261579 | 9/2000 |
| JP | 2000-267857 | 9/2000 |
| JP | 2000-324195 | 11/2000 |
| JP | 2000-330917 | 11/2000 |
| JP | 2001-007975 | 1/2001 |
| JP | 2001-056753 | 2/2001 |

\* cited by examiner

*Primary Examiner*—Aung S. Moe
*Assistant Examiner*—Dillon Murphy
(74) *Attorney, Agent, or Firm*—Buchanan Ingersoll & Rooney PC

(57) ABSTRACT

When electronic mail indicating termination of firmware rewriting has arrived from an image formation apparatus that has received divided firmware, the transmitter side of the firmware determines whether rewriting has ended properly or not from the mail. When rewriting has ended properly, electronic mail with the next divided firmware attached is transmitted based on the division number, divisor value, machine type and module indicated in a Subject field. When rewriting has not ended properly, the same firmware indicated in the Subject field is transmitted again. Accordingly, divided firmware can be transmitted appropriately. Thus, firmware of a large size can be transmitted appropriately even in the case where the size set at the mail server is restricted.

9 Claims, 19 Drawing Sheets

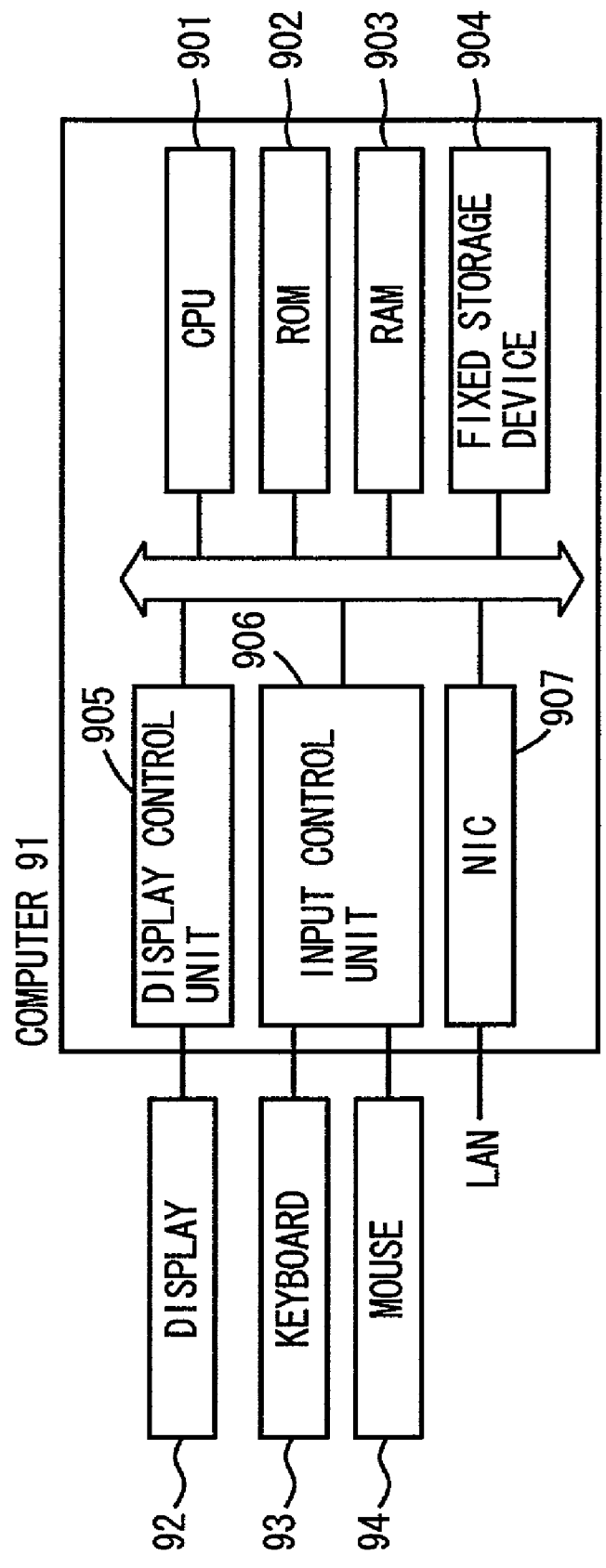
F I G. 4

FIG. 6

| No. (ID) | MACHINE TYPE | ELECTRONIC MAIL ADDRESS | RESTRICTED SIZE INFORMATION | OTHER INFORMATION .... |
|---|---|---|---|---|
| 1 | model1 | device1@customer1.com | 1M | |
| 2 | model2 | device2@customer1.com | 2M | |
| 3 | model3 | device1@customer2.com | NULL | |
| ... | ... | ... | ... | |

| No. (ID) | DIVISOR VALUE |
|---|---|
| 1 | 4 |
| 10 | 2 |
| 21 | — |
| : | |

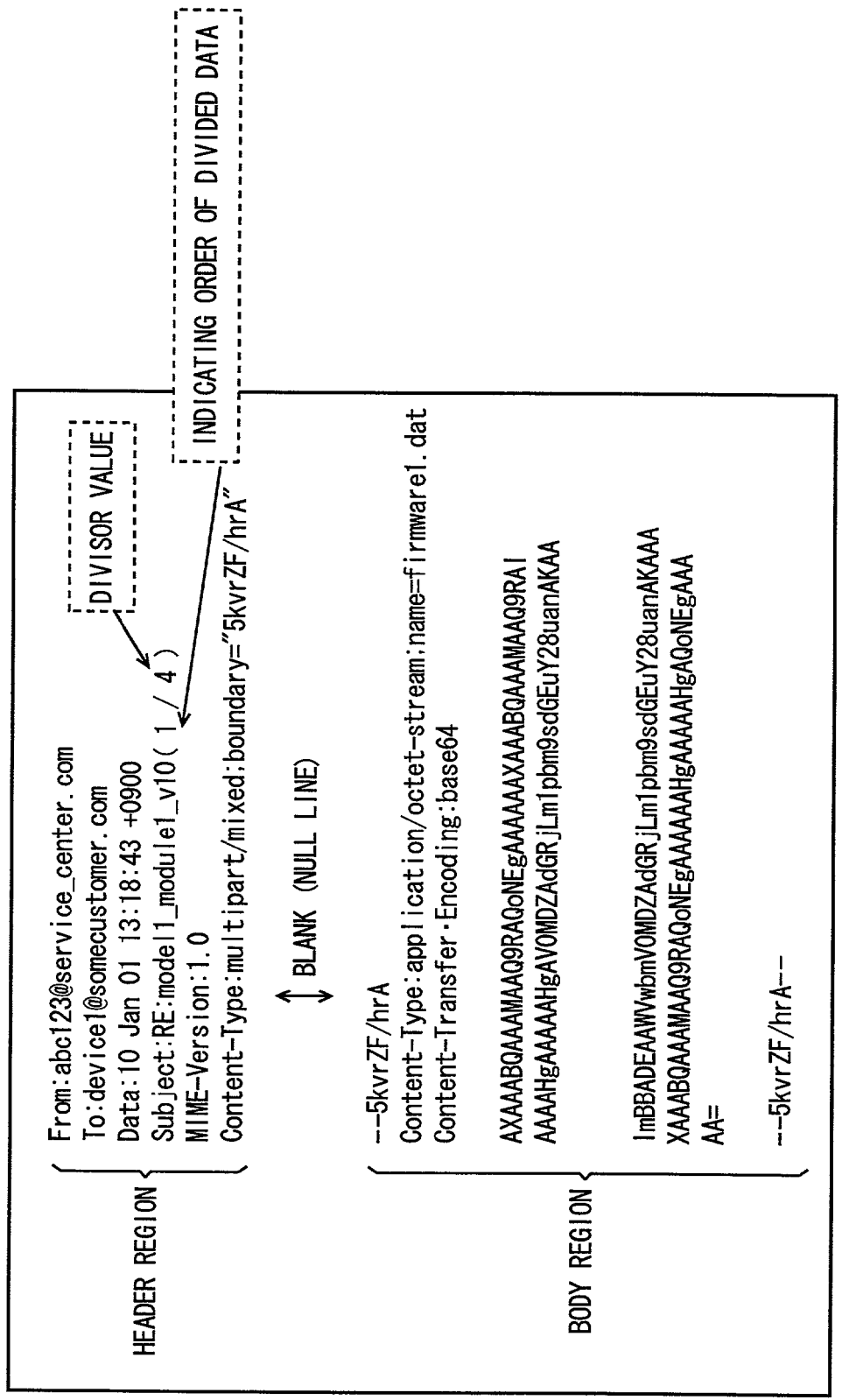

F I G. 11

ELECTRONIC MAIL MESSAGE

HEADER REGION
```
From:abc123@service_center.com
To:device1@somecustomer.com
Data:10 Jan 01 13:18:43 +0900
Subject:model1_module1_v10
MIME-Version:1.0
Content-Type:multipart/mixed;boundary="5kvrZF/hrA"
```
⇕ BLANK (NULL LINE)

BODY REGION
```
--5kvrZF/hrA
Content-Type:application/octet-stream;name=firmware1.dat
Content-Transfer-Encoding:base64

AXAAABQAAAMAAQ9RAQoNEgAAAAAXAAABQAAAMAAQ9RAI
AAAAHgAAAAHgAV0MDZAdGRjLm1pbm9sdGEuY28uanAKAA

----

ImBBADEAAWVwbmVOMDZAdGRjLm1pbm9sdGEuY28uanAKAAA
XAAABQAAAMAAQ9RAQoNEgAAAAAHgAAAAHgAQoNEgAAA
AA=

--5kvrZF/hrA--
```

DATA COMMUNICATION PROGRAM PRODUCT TRANSMITTING FIRMWARE IN DIVISIONAL MANNER

This application is based on application No. 2001-98908 filed in Japan, the contents of which are hereby incorporated by reference.

BACKGROUND OF THE INVENTION

1. Field of the Invention

The present invention relates to a program product for data communication, a computer-readable recording medium in which a data communication program is recorded, a data communication apparatus, and a data communication method. Particularly, the present invention relates to a data communication program providing communication of firmware data via the Internet, a computer-readable recording medium in which the data communication program is recorded, a data communication apparatus, and a data communication method.

2. Description of the Related Art

The firmware controlling the operation of, for example, an image formation apparatus is conventionally written into a mask ROM (Read Only Memory). When the firmware has to be exchanged, the method is taken of replacing the mask ROM on the control board in the image formation apparatus with a mask ROM into which new firmware is written.

The exchange of a mask ROM is time-consuming and complicated. Therefore, a rewritable flash ROM is used instead of a mask ROM to improve the workability.

Methods set forth below have been taken to exchange the firmware written in a flash ROM.

As the first method, the method of using an external storage device such as a memory card is known. An I/F (interface) with an external storage device such as a memory card is provided in the image formation apparatus. A memory card with the new firmware is connected to that I/F. Then, the new firmware is written from the memory card to the flash ROM. In rewriting the firmware, remote operation is not possible. The operation must be carried out actually at the site where the image formation apparatus is installed.

A method of utilizing a public switched network is known as the second method. This method is adapted to practical usage mainly in the field of facsimile apparatuses. Specifically, firmware is transmitted to an image formation apparatus from a remote apparatus connected to the public switched network. By downloading the transmission, the firmware is rewritten. Although there is no need to be actually present at the site as in the first method, the communication cost is high. Also, downloading the firmware is relatively time-consuming.

Reflecting the spread of the Internet, downloading the firmware through the Internet instead of through the public switched network is taken as the third method. The usage of the Internet allows reduction in the cost of transmission and the time required to download the firmware.

There are various protocols for communication through the Internet such as an HTTP (Hyper Text Transfer Protocol) to view a home page, an FTP (File Transfer Protocol) to transfer a file, an SMTP (Simple Mail Transfer Protocol) used in the communication of electronic mail, and the like. However, the protocol to download the firmware from a remote station to an image formation apparatus through the Internet is limited from the standpoint of security on the communication through the Internet.

Specifically, a firewall generally functioning as a "barrier" is provided at the connection of the Internet and each user to cope with illegal access and the like from the Internet into the user's internal system. The firewall has the capability to control the communication protocol that can be passed between the Internet and the internal system of the user. Accordingly, the passable protocol is limited. In general, the protocol of electronic mail is often set as passable. Therefore, the method of using an electronic mail system is conventionally employed in transmitting firmware via the Internet.

The above third method, i.e., the method of transmitting firmware utilizing an electronic mail system has problems set forth below.

The size of the firmware in an image formation apparatus has now become as large as approximately 10 Mbytes in accordance with the high function and multi-feature thereof. It is expected that the size of the firmware will further increase in the future.

The mail server that collects electronic mail and provides distribution service generally has the size of the electronic mail that can be received restricted. The size of the electronic mail is often restricted to approximately 1 Mbytes.

In the case where firmware of the aforementioned size is to be transmitted through electronic mail, it is expected that rejection of receiving such large electronic mail will frequently occur since it exceeds the restricted size.

To this end, an approach to divide the firmware into an appropriate size for transmission is known. With regards to a mail server, the total size of a message that can be retained for each mail account is generally limited, in addition to the limitation in the size of each message to be received. Therefore, even if the firmware is divided and attached to a plurality of messages, transmission of the entirety thereof at one time will exceed the restricted size set for each mail account. There is a possibility that the firmware cannot be transmitted appropriately.

SUMMARY OF THE INVENTION

In view of the foregoing, an object of the present invention is to provide a program product for data communication that allows appropriate transmission and reception of firmware using an electronic mail system even in the case where the size of the firmware is greater than the restricted size set at the mail server, a computer-readable recording medium in which the data communication program is recorded, a data communication apparatus, and a data communication method.

To achieve the above object, a data communication program product according to an aspect of the present invention causes a computer to execute a divide step of dividing firmware into a plurality of parts, a first transmission step of attaching one firmware among the plurality of divided firmware to electronic mail and transmitting that electronic mail to an addressee, an acquirement step of acquiring information related to a rewrite result of firmware transmitted from the addresee acquiring the one firmware attached to the electronic mail, and a second transmission step of attaching one firmware among the plurality of divided firmware to electronic mail and transmitting that electronic mail to the addressee based on information related to the acquired rewrite result.

According to the present invention, the firmware that is the subject of rewriting is divided into a plurality of parts, and one of the plurality of divided firmware is transmitted in a form attached to electronic mail. By attaching firmware of large size to electronic mail, the event of exceeding the restricted size of individual electronic mail set at the mail server can be circumvented. Reception of electronic mail will not be denied.

Thus, a data communication program product is provided that can appropriately transmit and receive firmware using an electronic mail system even in the case where the size of the firmware is greater than the restricted size set at the mail server.

According to another aspect of the present invention, a data communication program product causes a computer to execute a reception step of receiving electronic mail with one of a plurality of divided firmware attached, a derive step of deriving the firmware from the received electronic mail, a write step of writing the derived firmware into a predetermined memory, a determination step of determining whether writing into a memory in the write step has succeeded or not, and a notification step of notifying the transmission source of electronic mail the determination result of the determination step.

According to the present invention, upon reception of electronic mail with one of a plurality of divided firmware attached, firmware is derived therefrom and written into a predetermined memory. Therefore, firmware divided to become smaller than the restricted size of the mail server can be appropriately written into a desired region in the memory.

Determination is made whether writing has succeeded or not, and the transmission source is notified of the determination result. Therefore, appropriate firmware can be transmitted from the transmission source following reception of the determination result. Thus, the event of electronic mail with firmware attached sent at one time exceeding the restricted size set for each mail account of the mail server can be circumvented.

Thus, a data communication program product is provided that can appropriately transmit/receive firmware through an electronic mail system even in the case where the size of the firmware is larger than the restricted size set at the mail server.

According to a further aspect of the present invention, a data communication program product causes a computer to execute a first reception step of receiving electronic mail with one of a plurality of divided firmware attached, a derive step of deriving firmware from the received electronic mail, a step of transmitting the derived firmware to a predetermined control module, a second reception step of receiving a result of whether writing of firmware into a memory in the control module has succeeded or not, and a notification step of notifying the transmission source of electronic mail the write result received by the second reception step.

According to the present invention, upon reception of electronic mail with one of a plurality of divided firmware attached, firmware is derived therefrom and transmitted to a predetermined control module. Therefore, firmware divided into a size smaller than the restricted size of the mail server is appropriately transmitted to a desired control module.

A write result of whether writing firmware into a memory has succeeded or not is received from the control module, and the transmission source of the electronic mail is notified of the reception result. Appropriate firmware will be transmitted after receiving the write result from the transmission source. Therefore, the event of electronic mail with firmware attached sent at one time exceeding the restricted size set for each account of the mail server can be circumvented.

Thus, a data communication program product is provided that can appropriately transmit/receive firmware through an electronic mail system even in the case where the size of the firmware is larger than the restricted size set at the mail server.

According to still another aspect of the present invention, a computer-readable recording medium has a data communication program product of any of the above aspects recorded.

According to a still further aspect of the present invention, a data communication apparatus includes a divide portion for dividing firmware into a plurality of parts, a first transmission portion for attaching one of the plurality of divided firmware to electronic mail and transmitting that electronic mail to an addressee, an acquirement portion for acquiring information relating to a rewrite result of firmware sent from the addressee acquiring the firmware attached to the electronic mail, and a second transmission portion for attaching one of the plurality of divided firmware to electronic mail and transmitting that electronic mail to the addressee based on information relating to the obtained rewrite result.

According to yet a further aspect of the present invention, a data communication apparatus includes a reception portion for receiving electronic mail with one of a plurality of divided firmware attached, a derive portion for deriving firmware from the received electronic mail, a writing portion for writing the derived firmware into a predetermined memory, a determination portion for determining whether writing into the memory by the writing portion has succeeded or not, and a notification portion for notifying the transmission source of electronic mail the determination result made by the determination portion.

According to yet another aspect of the present invention, an image formation apparatus includes a data communication apparatus of the above aspect. In the case where firmware of an image formation apparatus is to be rewritten using an electronic mail system and the size of the firmware is greater than the restricted size set at the mail server, the firmware can be transmitted/received appropriately to allow firmware rewriting.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram of a circuit structure of a computer 91 installed at a service center side.

FIG. 6 shows an example of data registered on a fixed storage device 904 in an image formation apparatus registration process (step S509) of FIG. 5.

FIG. 10 shows an example of a message text of electronic mail with divided firmware attached.

FIG. 11 shows an example of a message text of electronic mail with firmware that is not divided attached.

DESCRIPTION OF THE PREFERRED EMBODIMENTS

Embodiments of the present invention will be described in detail hereinafter with reference to the drawings.

Figure 1:
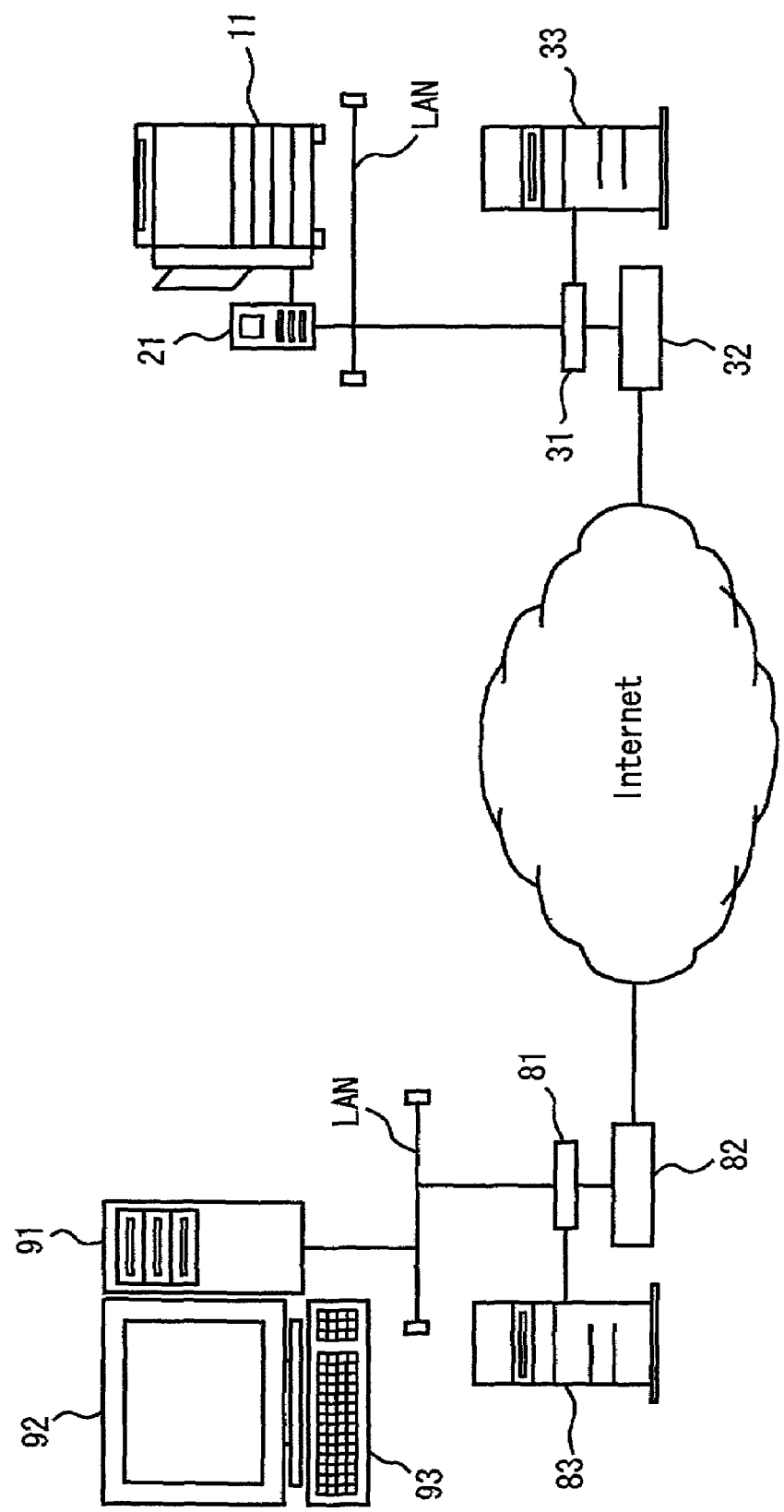
FIG. 1 shows a system structure to implement a rewrite method of firmware according an embodiment of the present invention.

Here, the case where firmware of an image formation apparatus is rewritten utilizing an electronic mail system will be described. Referring to FIG. 1, the present system is constituted by an apparatus of the user side including a plurality of image formation apparatus, an apparatus of a service center side to transmit firmware to an image formation apparatus, and the Internet providing connection therebetween.

In the present system, the apparatus of a plurality of users can be connected to the apparatus of one service center. However, for the sake of simplification, the present system corresponds to connection of apparatuses of one user (set).

The apparatus at the user side includes an image formation apparatus 11, and a printer controller 21 connected thereto. Printer controller 21 is connected to a firewall 31 via a LAN (Local Area Network), and further to the Internet via a router 32. Also, a mail server 33 that collects electronic mail and provides distribution service is connected to the LAN.

At the service center side, a computer 91 that transmits firmware is installed. Computer 91 is connected to a firewall 81 via the LAN, and to the Internet via a router 82 to communicate with printer controller 21 of the user side. Also, a mail server 83 that collects electronic mail and provides distribution service is connected to the LAN.

Although not shown, there are a plurality of mail servers on the Internet between router 82 and router 32. Electronic mail is transmitted via these plurality of undefined mail servers.

Here, an operation of rewriting firmware will be described briefly. First, new firmware is attached to electronic mail and transmitted from computer 91 of the service center side towards image formation apparatus 11 of the user side. The attached firmware here has been divided into a plurality of parts. The electronic mail with firmware attached passes through the LAN of the service center, mail server 83, the Internet, the LAN of the user to be stored in a mail box of mail server 33.

Printer controller 21 of image formation apparatus 11 at the user side downloads the electronic mail from mail server 33. Firmware is derived from the electronic mail and written into the flash ROM that is the subject of rewriting in image formation apparatus 11. Then, the rewrite result is transmitted to computer 91 at the service center side.

Computer 91 receiving the result attaches another one from the plurality of divided firmware to electronic mail, when rewriting has succeeded, and transmits the electronic mail towards image formation apparatus 11. In the case where rewriting has failed, the same firmware is transmitted again.

The apparatus of each apparatus shown in FIG. 1 will be described in detail hereinafter.

Figure 2:
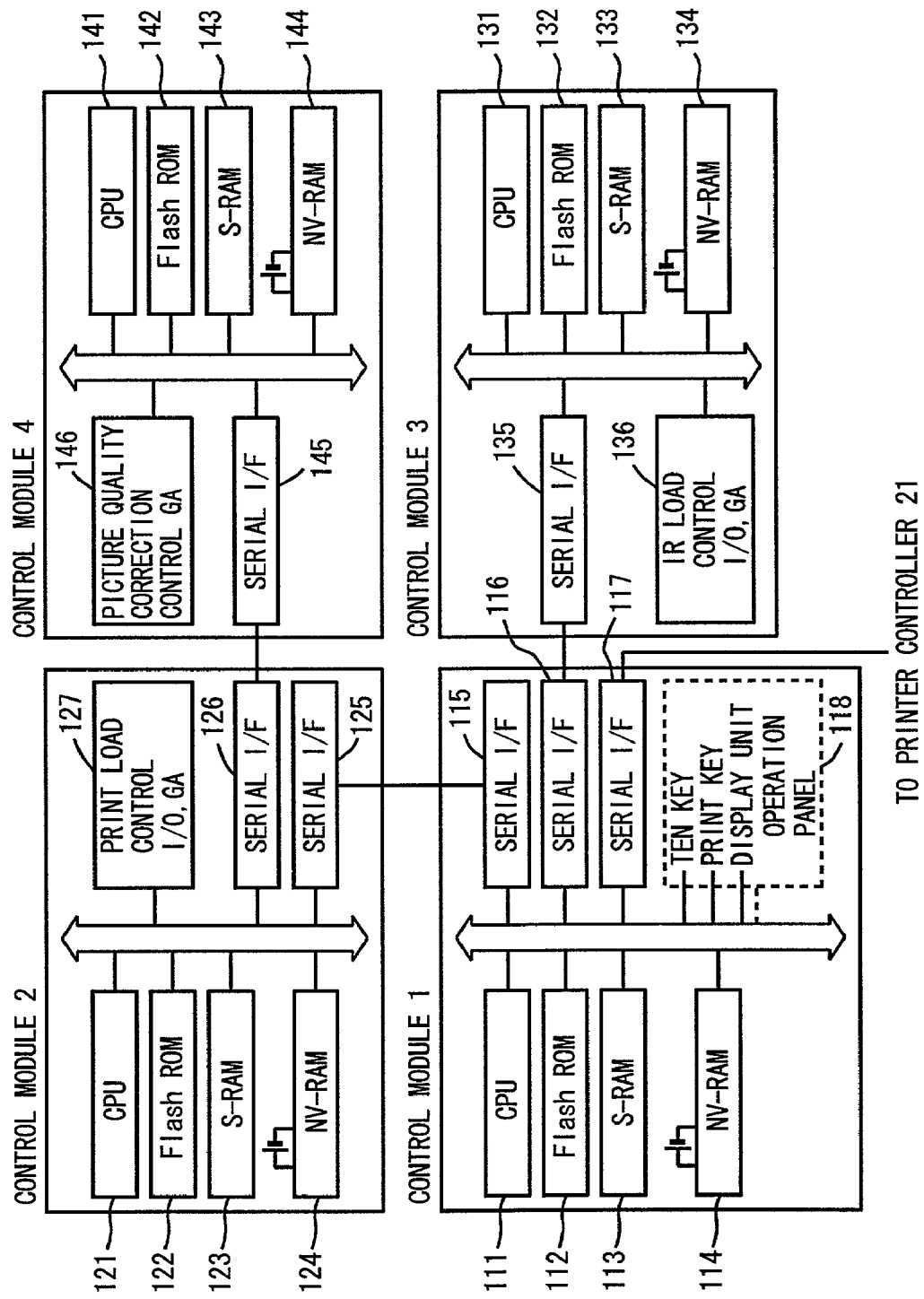
FIG. 2 is a block diagram showing a circuit diagram of an image formation apparatus 11.

FIG. 2 is a block diagram of a circuit structure of image formation apparatus 11. Referring to FIG. 2, image formation apparatus 11 is an apparatus of a multi CPU (Central Processing Unit) configuration to scan a document image and form a copy image on a sheet. Image formation apparatus 11 is constituted by four control modules, i.e., a control module 1-a control module 4, corresponding to each CPU.

Control module 1 includes a CPU 111 providing overall control of image formation apparatus 11, a rewritable flash ROM 112 stored with firmware, an S-RAM 113 that is a working region, an NV-RAM 114 with battery-backup for storing various set values, a serial I/F 115 transmitting/receiving various control data to/from control module 2, a serial I/F 116 transmitting/receiving various control data to/from control module 3, a serial I/F 117 transmitting/receiving various data to/from printer controller 2, and an operation panel 118 with various keys and displays.

Control module 2 includes a CPU 121 controlling the print process of image formation apparatus 11, a rewritable flash ROM 122 having firmware stored therein, a S-RAM 123 that is a working area, an NV-RAM 124 with battery-backup for storing various setting values, a serial I/F 125 transmitting/receiving various control data to/from control module 1, a serial I/F 126 transmitting/receiving various control data to/from control module 4, and a print load control I/O, GA 127 controlling the load of an image formation apparatus.

Control module 3 includes a CPU 131 controlling the read process of a document image in image formation apparatus 11, a rewritable flash ROM 132 in which firmware is stored, a S-RAM 133 that is a working area, a NV-RAM 134 with battery-backup for storing various set values, a serial I/F 135 transmitting/receiving various control data to/from control module 1, and an IR load control I/O, GA 136 controlling the load of the read processes of a document image.

Control module 4 includes a CPU 141 controlling the correction of the picture quality for image formation apparatus 11, a rewritable flash ROM 142 in which firmware is stored, a S-RAM 143 that is a working area, a NV-RAM 144 with battery-backup for storing various set values, a serial I/F 145 transmitting/receiving various control data to/from control module 2, and a picture quality correction control GA 146 providing picture quality correction control.

These control modules 1-4 execute communication via the serial I/F. In general, the control command and control information between the CPU of each module is transmitted/received. When a firmware is to be rewritten, firmware data is transmitted. Since the communication via a serial I/F is based on a structure conforming to the communication data size of the control command and control information generally used, transmission of data of a large size such as firmware is time-consuming. There are cases where transmission of firmware is more time-consuming than the transmission of electronic mail from center PC 91 to image formation apparatus 11, depending upon the data size of the firmware.

Figure 3:
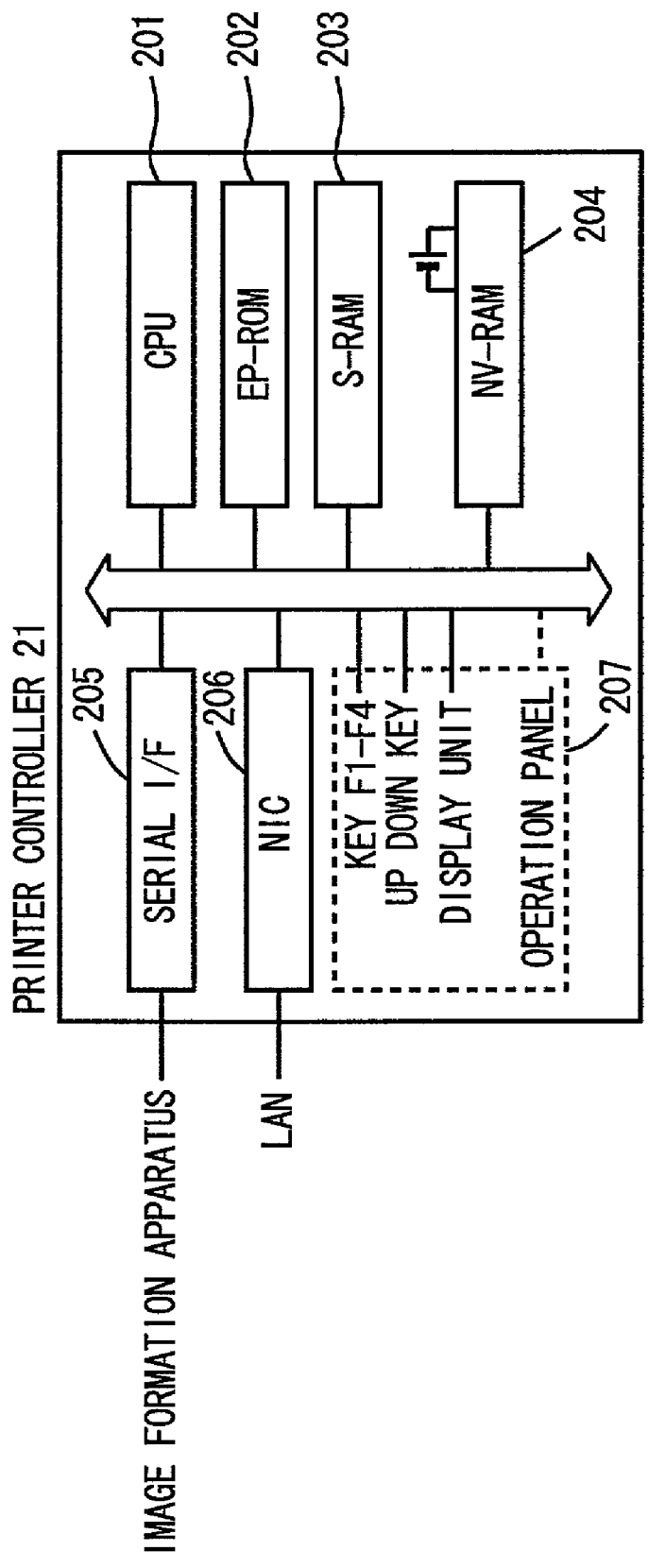
FIG. 3 is a block diagram of a circuit structure of a printer controller 21.

FIG. 3 is a block diagram of a circuit structure of printer control 21. Referring to FIG. 3, printer controller 21 includes a CPU 201, an EPROM 202 in which the control program thereof is stored, an S-RAM 203 that is a working area, a NV-RAM (non-volatile memory) 204 storing various set values, a serial I/F 205 transmitting/receiving various data to/from image formation apparatus 11, an NIC (Network Interface Card) 206 to transmit/receive various data through the LAN, and an operation panel 207 to set various operations.

NV-RAM 204 stores, in addition to its own IP address, the mail server IP address required for printer controller 21 to download from mail server 33 an electronic mail message addressed to itself (image formation apparatus 11), the name and password of its own electronic mail account, as well as the network address of another image formation apparatus 11 connected to the LAN and the like.

FIG. 4 is a block diagram of a circuit structure of computer 91 installed at the service center side. Referring to FIG. 4, computer 91 includes a CPU 901 providing overall control of the apparatus, a ROM 902 in which a program and the like are stored, a RAM 903 that is a working region and a region where various data are temporarily stored, a fixed storage device 904 where various information are stored, a display control unit 905 controlling a display 92, an input control unit 906 controlling a keyboard 93 and a mouse 94, and an NIC 907 to transmit/receive various data to/from an external source through the LAN.

Fixed storage device 904 stores registration information of an image formation apparatus including the machine type and electronic mail address of image formation apparatus 11, and the restricted size information set at the mail server. Also, the firmware corresponding to the machine type of the image formation apparatus 11 is stored.

An operator at the service center prestores the firmware in a predetermined different folder/directory in fixed storage device 904 according to the machine type and control module thereof.

The operation of rewriting the firmware in an image formation apparatus from a remote station according to the system of FIG. 1 will be described hereinafter.

The process carried out at CPU 901 mounted in computer 91 of the service center will be described with reference to FIGS. 5-8.

Figure 5:
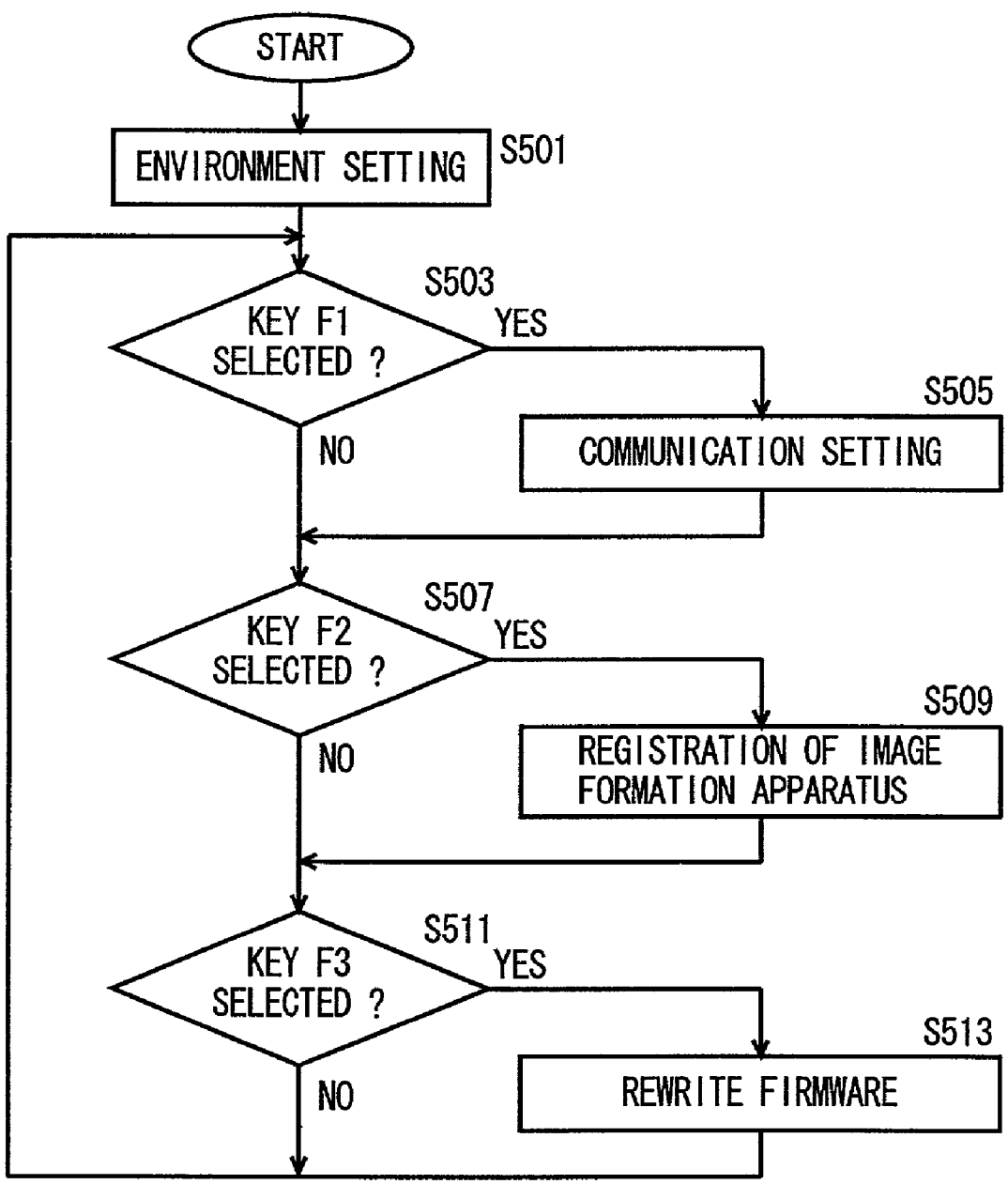
FIG. 5 is a flow chart of the main routine of a process carried out by a CPU 901 of computer 91 at the service center side.

FIG. 5 is a flow chart of the main routine of the process carried out by CPU 901 of computer 91 at the service center. CPU 901 commences the process in response to the power being turned on. First, an initialization process generally carried out by the computer is executed such as initialization of the memory and parameters (step S501). Then, in response to an input operation of various function keys (F1 to F3) on keyboard 93, a communication set process (step S505), an image formation apparatus registration process (step S509), or a firmware transmission process (step 513) is carried out.

When key F1 is input (YES at step S503), a communication set process is carried out at step S505. Specifically, the parameters required for electronic mail transmission by computer 91 are set. For example, the IP address of mail server 83 connected to the LAN at the service center side, the electronic mail address of computer 91 and the like are input and stored in fixed storage device 904. The electronic mail address of computer 91 is set in the From field when computer 91 transmits electronic mail with firmware attached to printer controller 21.

When key F2 is input (YES at step S507), a registration process of an image formation apparatus is carried out at step S509. Specifically, the machine type of each image formation apparatus, the electronic mail address the restricted size information set at the corresponding mail server, information of the name, address, telephone number and the like of the user of each image formation apparatus, when necessary, are stored in fixed storage device 904.

When key F3 is input (YES at step S511), a firmware transmission process is carried out at step S513. Specifically, firmware of the machine type that is the target of rewriting is divided and an appropriate one is attached to electronic mail and transmitted to monitor device 41.

FIG. 6 shows an example of data registered in fixed storage device 904 at the image formation apparatus registration process (step S509) of FIG. 5. The operator of the service center inputs information associated with the relevant image formation apparatus using keyboard 93, mouse 94 and the like to computer 91, prior to rewriting the firmware of the image formation apparatus.

As shown in FIG. 6, the information associated with the image formation apparatus includes the machine type of the image formation apparatus, the electronic mail address, and the restricted size information of the mail server that is used. Additionally, user information such as the name, address, telephone number and the like of the user of the image formation apparatus can be included to facilitate identification of the image formation apparatus.

The information associated with the image formation apparatus is input to computer 91 and stored in fixed storage device 904 in a table format, as shown in FIG. 6. For the sake of simplification, this information in a table format is referred to as "registration information table" hereinafter.

Figure 7:
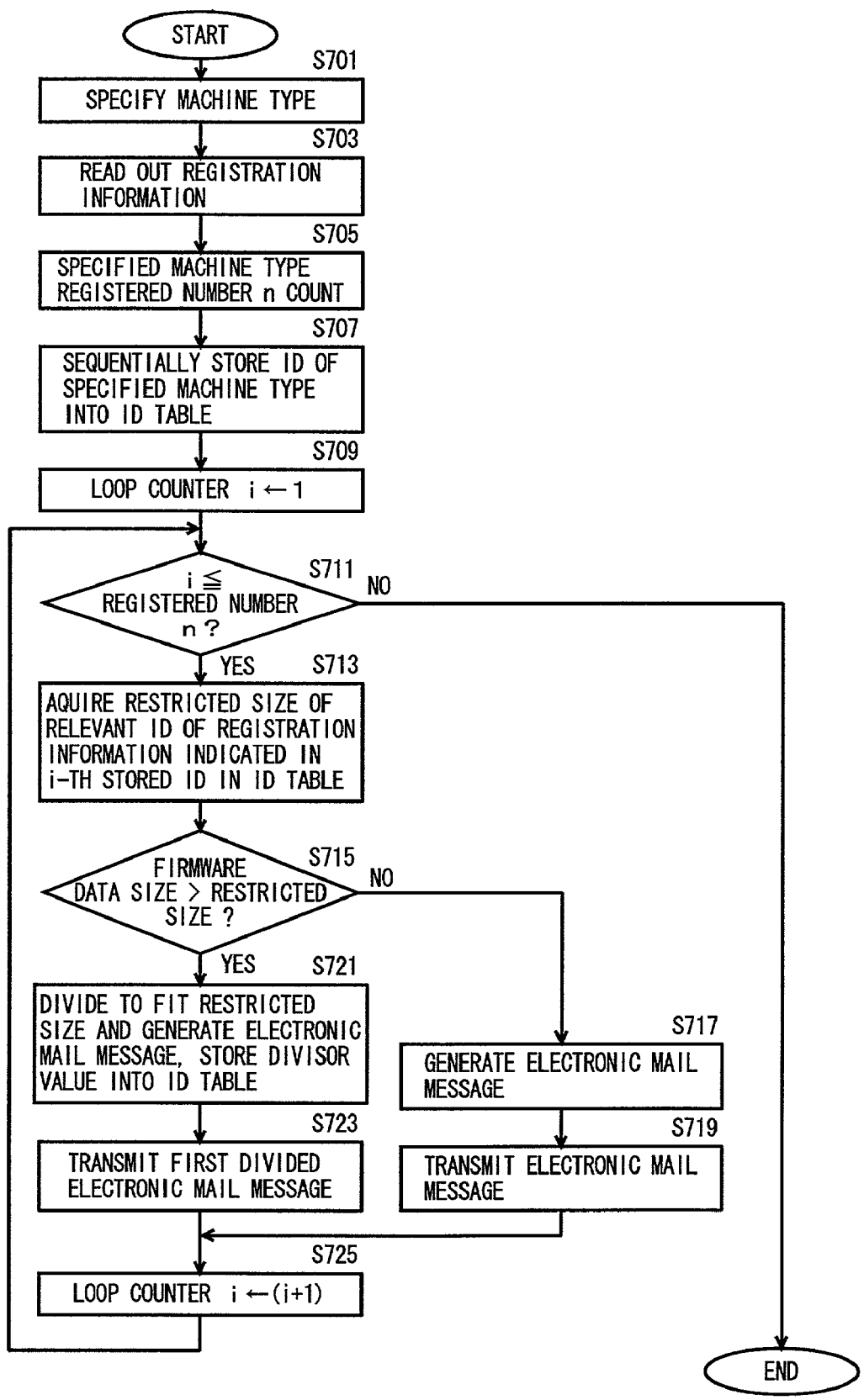
FIG. 7 is a flow chart of the details of a firmware transmission process (step S513) of FIG. 5.

The process flow of an electronic mail message with firmware attached being generated by computer 91 and transmitted to image formation apparatus 11 when the firmware of the image formation apparatus has to be rewritten will be described hereinafter. FIG. 7 is a flow chart of the details of the firmware transmission process (step S513) of FIG. 5, executed by CPU 901 of computer 91.

Referring to FIG. 7, the operator of the service center uses keyboard 93, mouse 94 and the like to specify the machine type of the image formation apparatus that is the target of firmware rewriting as well as the control module thereof to computer 91 at step S701. The machine type and control module are specified since the firmware of an image formation apparatus generally differs depending upon the machine type and the control module.

Figures 8, 13:
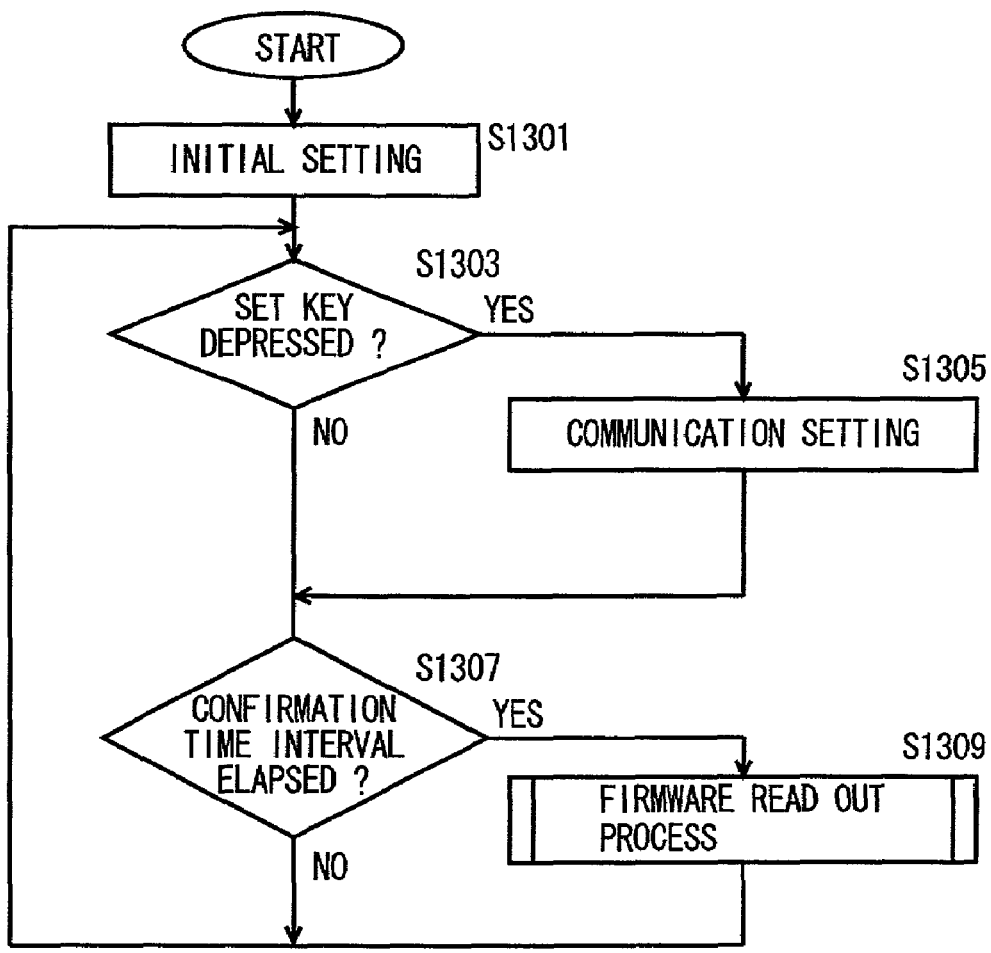
FIG. 8 shows an example of an ID table registered on fixed storage device 904.
FIG. 13 is a flow chart of the main routine of a process carried out by a CPU 201 of printer controller 21 of image formation apparatus 11.

At step S703, the registration information table (FIG. 6) stored in fixed storage device 904 is read out. At step S705, the registered number n for the machine type of the specified image formation apparatus is counted. At step S707, the ID of the specified machine type is sequentially stored in an ID table as shown in FIG. 8. The ID table is used to check the restricted size for every specified machine type to appropriately divide the firmware.

Following storage into the ID table, control proceeds to step S709 where 1 is set in loop counter i. In the following steps S711 to S725, an appropriate division of the firmware is carried out for the image formation apparatus of the specified machine type registered in the ID table of FIG. 8. Then, a transmission process of electronic mail is carried out.

Specifically, when the value of loop counter i is equal to or below the registered number n in the ID table (YES at step S711), control proceeds to step S713 where the restricted size information in the registration information table of FIG. 6 corresponding to the ID stored in the i-th record from the top in the ID table is obtained.

At step S715, the size of the firmware of the specified machine type is compared to the acquired restricted size. When the size of the firmware is larger (YES at step S715), firmware division is effected.

At step S721, the firmware is divided so as to fit the restricted size set at the mail server. The divisor value is stored in the ID table. Then, an electronic mail message is generated using the divided firmware. At step S723, the generated electronic mail message is transmitted towards image formation apparatus 11. In other words, when connection with mail server 83 is established based on the IP address of mail server 83 set at step S505 of FIG. 5, an electronic mail message is transmitted to mail server 83 according to the SMTP protocol (RFC 821) which is the Internet standard of electronic mail transmission.

When the size of the firmware of the specified machine type is smaller than the restricted size of the mail server (NO at step S715), control proceeds to step S717 where an electronic mail message is generated without the firmware being divided. At step S719, the generated electronic mail message is transmitted towards image formation apparatus 11.

Following transmission of electronic mail, control proceeds to step S725 where the value in loop counter i is incremented by 1. Then, control returns to step S711. The process from step S711 to step S725 is carried out for all image formation apparatuses registered on the ID table.

When the process for all the apparatuses registered in the ID table has ended (NO at step S711), the firmware transmission process ends.

According to the above-described process, firmware is divided appropriately even in the case where the size of the firmware for the specified machine type is larger than the restricted size of the mail server. Therefore, the event that transmission is disabled can be circumvented.

Following transmission of electronic mail with firmware attached towards image formation apparatus 11 by computer 91 at the service center side, computer 91 waits for transmission of a return mail as to the rewrite result of firmware from image formation apparatus 11. Then, computer 91 transmits the next electronic mail.

Figure 9:
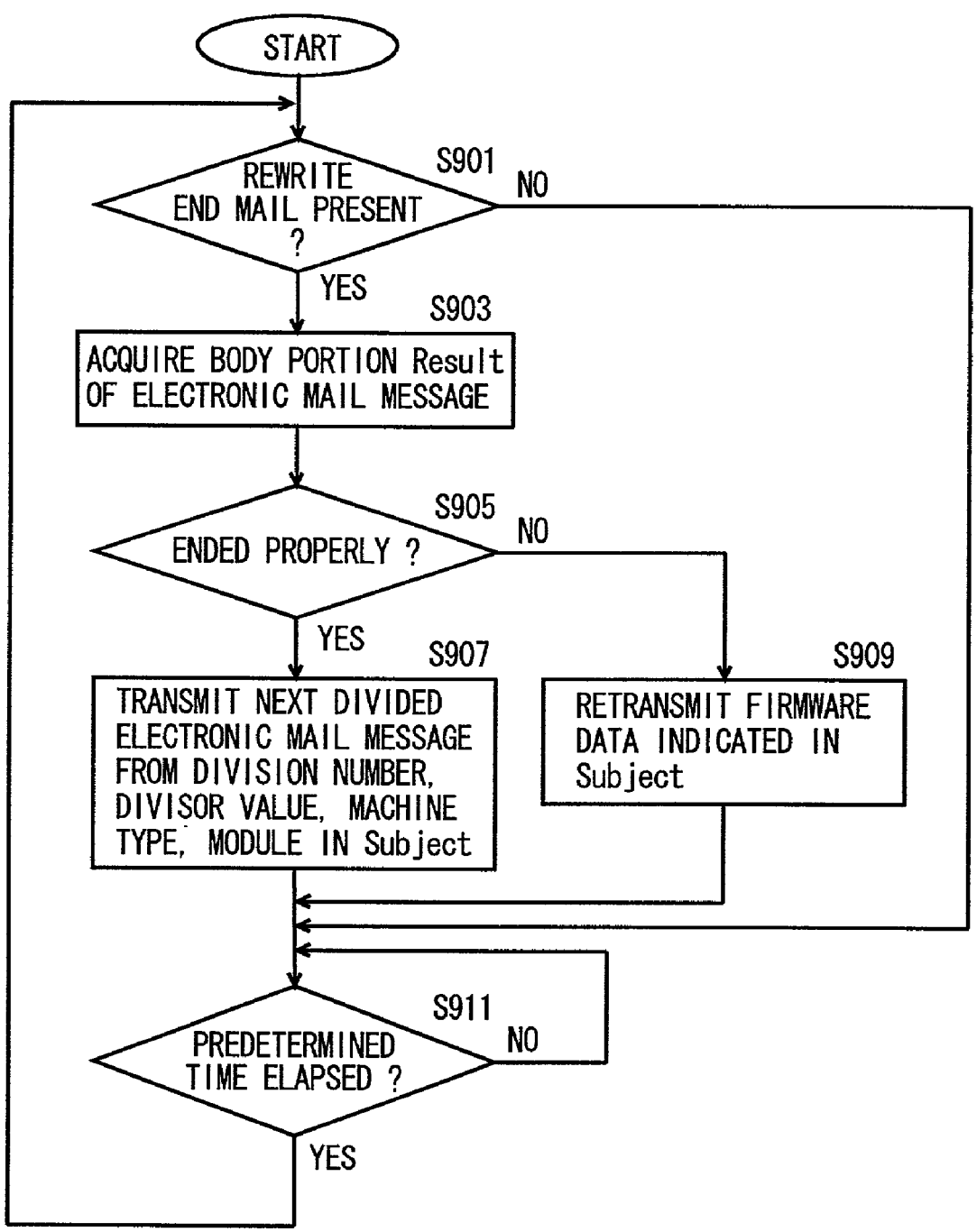
FIG. 9 is a flow chart of the process flow when a return mail for a rewrite result is received at computer 91.

FIG. 9 is a flow chart of the process flow when a return mail for the rewrite result is received at computer 91. At step S901, computer 91 checks mail server 83 whether a rewrite end electronic mail has arrived from image formation apparatus 11 conducting firmware rewriting. Determination of whether the mail is a rewrite end electronic mail not is based on whether a description related to firmware is present in the Subject field.

When a rewrite end mail has been delivered (YES at step S901), control proceeds to step S903 where the Result field in the body region of the electronic mail message is acquired. Accordingly, determination can be made whether firmware rewriting has succeeded or not.

When rewriting has ended properly (YES at step S905), control proceeds to step S907 where an electronic mail message with the next divided firmware attached is transmitted based on the division number, divisor value, machine type and module indicated in the Subject field. When rewriting has not ended properly (NO at step S905), control proceeds to step S909 where the firmware indicated in the Subject field is transmitted again.

At step S911, computer 91 waits for the elapse of a predetermined time. When the predetermined time has elapsed, control returns to step S901 where arrival of firmware rewrite end mail is checked.

By the above process, firmware that has exceeded the restricted size set at the mail server is appropriately divided into a plurality of parts, and attached to respective electronic mail in transmission thereof. Electronic mail attached with the next firmware is transmitted only after the rewrite end mail for the previous transmitted firmware has been received. Therefore, data will not be transmitted/received exceeding the restricted size set at the mail server.

Electronic mail with firmware attached will be described in detail with reference to FIGS. 10 and 11. FIG. 10 shows an example of a message text of electronic mail with divided firmware attached. FIG. 11 shows an example of a message text of electronic mail with firmware that is not divided attached.

Referring to FIGS. 10 and 11, the message field of electronic mail is mainly divided into a header region and a body region, delimited by a NULL line therebetween, according to the Internet standard (RFC 822) relating to an electronic mail message.

The header region is formed of a plurality of header fields defined by the Internet standard (RFC 822). Each header field is constituted by a field name from the beginning to ":", and a subsequent field body.

It is to be noted that the firmware of an image formation apparatus is binary data. It is inhibited by RFC 822 to directly write binary data into the message of electronic mail. Therefore, the MIME (Multipurpose Internet Mail Extensions) defined by RFC 2045, 2046, 2047 is utilized to attach the firmware of an image formation apparatus as a file in the body region of the message.

In addition to the fields of "From", "To", "Date", "Subject" and the like defined by RFC 822, the fields of "MIME-Version" and "ContentType" corresponding to the MIME extension definitions are provided at the header region of the message.

In the field body of the Subject field, a character string of the name of the machine type specified by the operator and the number of the target control module of the firmware to be attached, connected by an under bar, are written. For example, when the machine type is "model1" and the number of the target control module is "1", a character string of "model_1" is provided. In the case where the attached firmware data is one of the divided firmware, numbers indicating the divisor value and the order among the divided firmware data are added at the end. For example, when the relevant firmware corresponds to the first of firmware divided into 4 parts, the character of (1/4) is added at the end. In the case where the attached firmware data is not a divided one, no description of the divisor value and the like will be provided, as shown in FIG. 11.

In the field body of the Content-Type field, "Multipart/mixed" is specified so as to set the message body region dividable into a plurality of parts, and an appropriate US-ASCII character string ("5 kvrZF/hrA" after the character string here) is specified for the "Boundary" parameter indicating the boundary of respective parts.

In the body region of the message, a character string with "-" added to the beginning of the value of the boundary parameter ("5 kvrZF/hrA" here) of the Content-Type field of the header region is written to specify the beginning of one part. The Content-Type field is written below to specify "application/octet-stream" indicating that the file attached to the field body is binary data.

Therebelow, the "Content-Transfer-Encoding" field is written to specify "base 64" in the field body. Since direct description of binary data into the message of the electronic mail is inhibited by RFC 822, binary data must be converted into US-ASCII text. According to the MIME extension definition, a plurality of schemes for the conversion are defined. The Base 64 scheme is one thereof.

The binary data of firmware is converted into US-ASCII character by the Base 64 scheme and added below the above-described two fields. Lastly, a character string with "--" added before and after the value of the boundary parameter ("5 kvrZF/hrA" here) of the Content-Type field in the header region is written.

Figure 12:
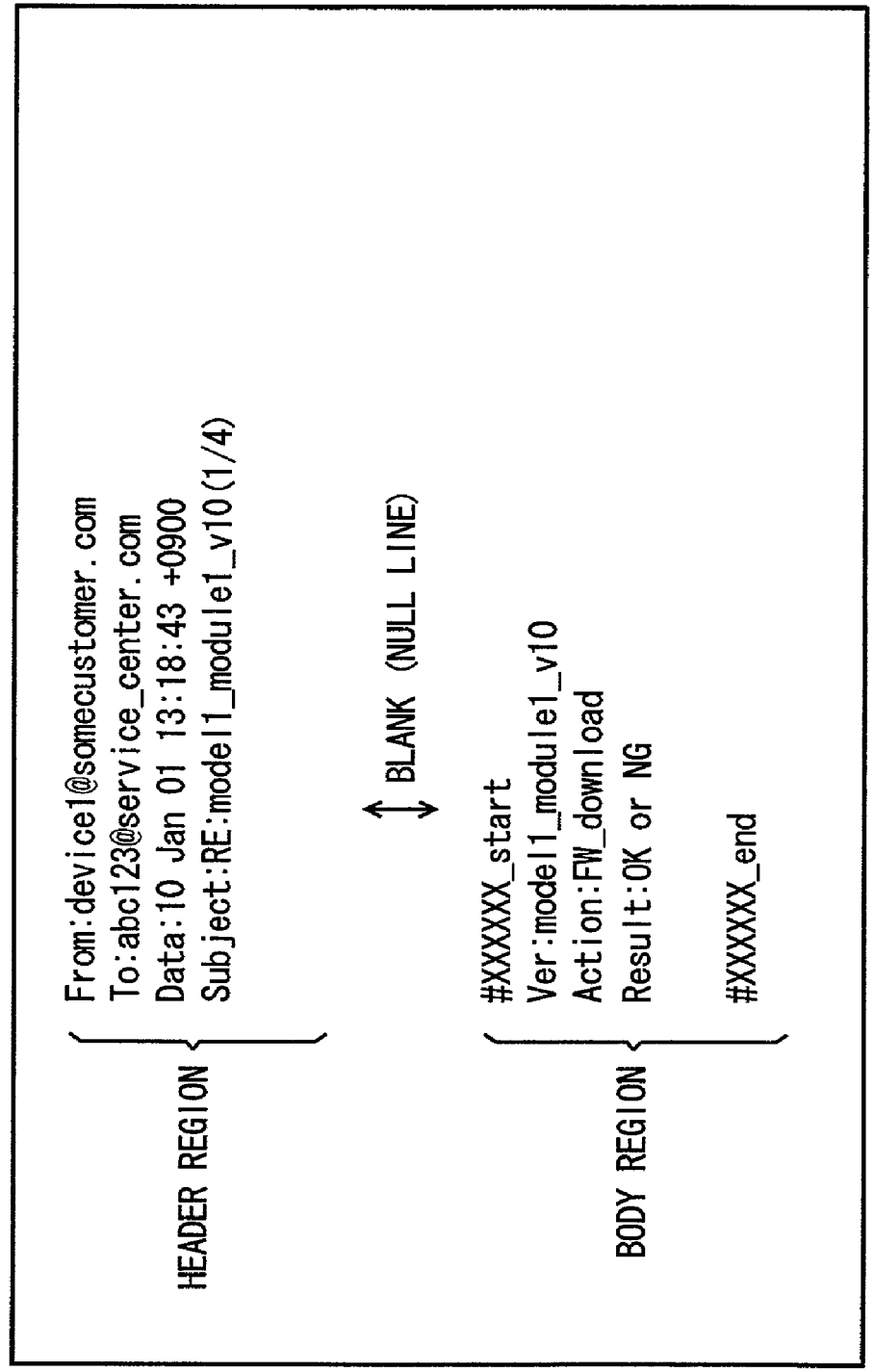
FIG. 12 shows an example of a message text of electronic mail for a rewrite result of firmware.

An electronic mail message corresponding to the case where an image formation apparatus receiving firmware has the firmware rewritten into the flash ROM that is the subject of rewriting and the rewriting result is returned through electronic mail will be described here. FIG. 12 shows an example of a message text of electronic mail for firmware rewrite result. Referring to FIG. 12, the message field of the electronic mail is divided into a header region and a body region with a NULL line therebetween, according to the Internet standard (RFC 822) relating to electronic mail message, similar to the messages shown in FIGS. 10 and 11.

In the Subject field, the machine type and module number are written. Also, the divisor value and the division number indicating the order of the received firmware among the plurality of divided firmware are written. In the Result field in the body region, either "OK" or "NG" indicating whether rewriting has succeeded or not is written.

By obtaining the contents of the Result field at the service center side receiving the electronic mail of a rewrite result, success or failure of rewriting can be identified. Also, by acquiring the contents of the Subject field, the next firmware to be attached to electronic mail for transmission can be identified together with the contents in the Result field.

The process at the user side will be described hereinafter. FIG. 13 is a flow chart of the main routine of the process carried out by CPU 201 of printer controller 21 of image formation apparatus 11. Referring to FIG. 13, CPU 201 commences the process by having power turned on. The initialization process generally carried out by a computer such as initialization of a memory and parameters is executed (step S1301). Then, a communication set process (step S1305) or a firmware read out process (step S1309) is carried out, as necessary.

For example, when key "SET" on operation panel 207 is input by the user (YES at step S1303), control proceeds to step S1305 where parameters required to transmit/receive electronic mail are set. Specifically, the IP address of mail server 33 connected to the LAN of the user side, the name and password of the electronic mail account of image formation apparatus 11 on mail server 33, the electronic mail address of image formation apparatus 11, a time interval to periodically confirm whether new electronic mail address to image formation apparatus 11 has arrived or not, and the like are input and stored in NV-RAM 204.

At step S1307, determination is made whether the time interval for confirmation has elapsed or not. Specifically, determination is made whether the time interval set at step S1305 (the time interval to confirm whether a new electronic mail message addressed to image formation apparatus 11 has arrived or not).

When the time interval has elapsed (YES at step S1307), control proceeds to step S1309 where CPU 201 confirms whether new electronic mail has been delivered with respect to mail server 33, and downloads the required electronic mail, when delivered. When the time interval for confirmation has not yet elapsed (NO at step S1307), control returns to, for example, step S1303, where the above process is repeated until the time interval for confirmation has elapsed.

The process of printer controller 21 confirming whether a new message addressed to image formation apparatus 11 has been delivered to mail server 33, and downloading the new message, when delivered, will be described printer controller 21.

Figure 14:
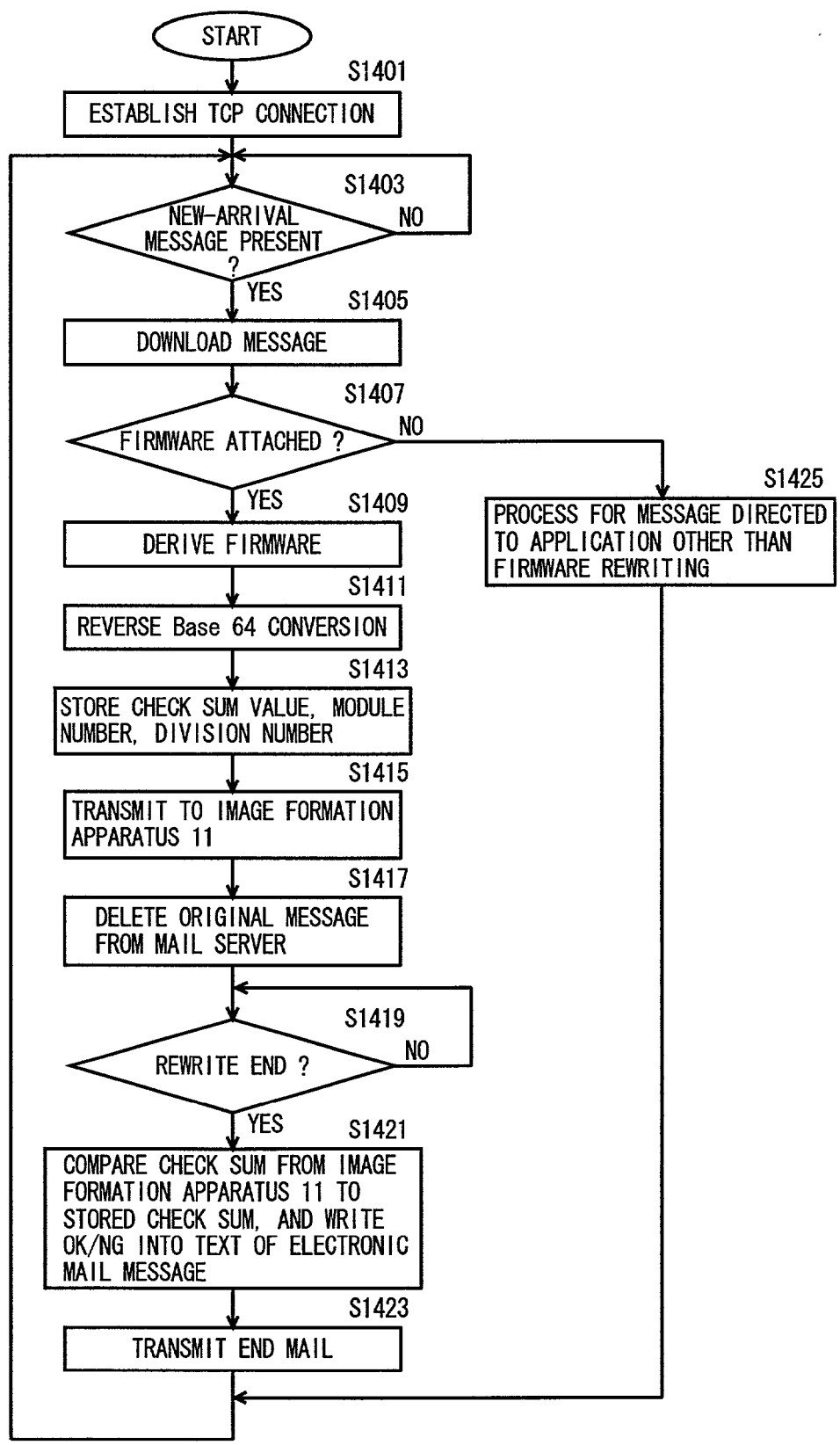
FIG. 14 is a flow chart of the details of a firmware read out process (step 1309) of FIG. 13.

FIG. 14 is a flow chart of the details of a firmware read process (step S1309) of FIG. 13. At step S1401, the TCP connection with mail server 33 is established based on the IP address of mail server 33 set at step S1305 of FIG. 13. Delivery of a new message addressed to image formation apparatus 11 is confirmed (step S1403).

In this confirmation process and the process that will be described afterwards of downloading, when delivered to mail server 33, a new message addressed to image formation apparatus 11, a POP 3 (Post Office protocol Version 3) protocol is used. Here, it is assumed that only one message is downloaded at one TCP connection even in the case where a plurality of new messages addressed to image information apparatus 11 are delivered to mail server 33.

When a new message addressed to image information apparatus 11 is delivered to mail server 33 as a result of confirming any new-arrival messages (YES at step S1403), control proceeds to step S1405 where that message is downloaded from mail server 33. At step S1407, determination is made whether the electronic mail has firmware attached. Attachment of firmware can be identified by, for example, whether the description in the field body in the "Content-Description" field in the header region of the message is "Firmware" or not.

In the case where firmware is attached (YES at step S1407), control proceeds to step S1409 where the US-ASCII character is extracted from the firmware region in the message. At step S1411, the extracted US-ASCII character is restored to binary data by reverse Base 64.

At step S1413, the target machine type of firmware and the number of the target control module are read out from the values in the Subject field from the header portion in the message. Then, a check sum of the binary data is calculated. It is to be noted that a check sum is performed for every module when firmware is transmitted at one time. The firmware, the number of a target control module, and the check sum value are temporarily stored in S-RAM 203. At step S1415, the firmware restored to binary data and the module number are transferred to image formation apparatus 11 via serial I/F 205.

At step S1417, the original message downloaded from mail server 33 is deleted. At step S1419, waiting is conducted until a firmware rewrite end notification is issued from image formation apparatus 11. Upon receiving a rewrite end notification (YES at step S1419), control proceeds to step S1421 where the value of the check sum sent from image formation apparatus 11 is compared to the value of the check sum temporarily stored in S-RAM 203. The result is written into the main text in the electronic mail message as OK or NG. At step S1423, the electronic mail with the result written (end mail) is transmitted towards computer 91 of the service center side.

In the case where the downloaded message does not have firmware attached (NO at step S1407), control proceeds to step S1425 where a process carried out when a message is received directed to an application other than firmware rewriting of an image formation apparatus is normally executed.

Thus, a message is downloaded from mail server 33 at printer controller 21 of image formation apparatus 11, and binary data of firmware is transmitted to image formation apparatus 11. The rewrite result is received from that image formation apparatus, and electronic mail indicating whether rewriting has succeeded or not is returned to computer 91 of the service center side.

Figure 15:
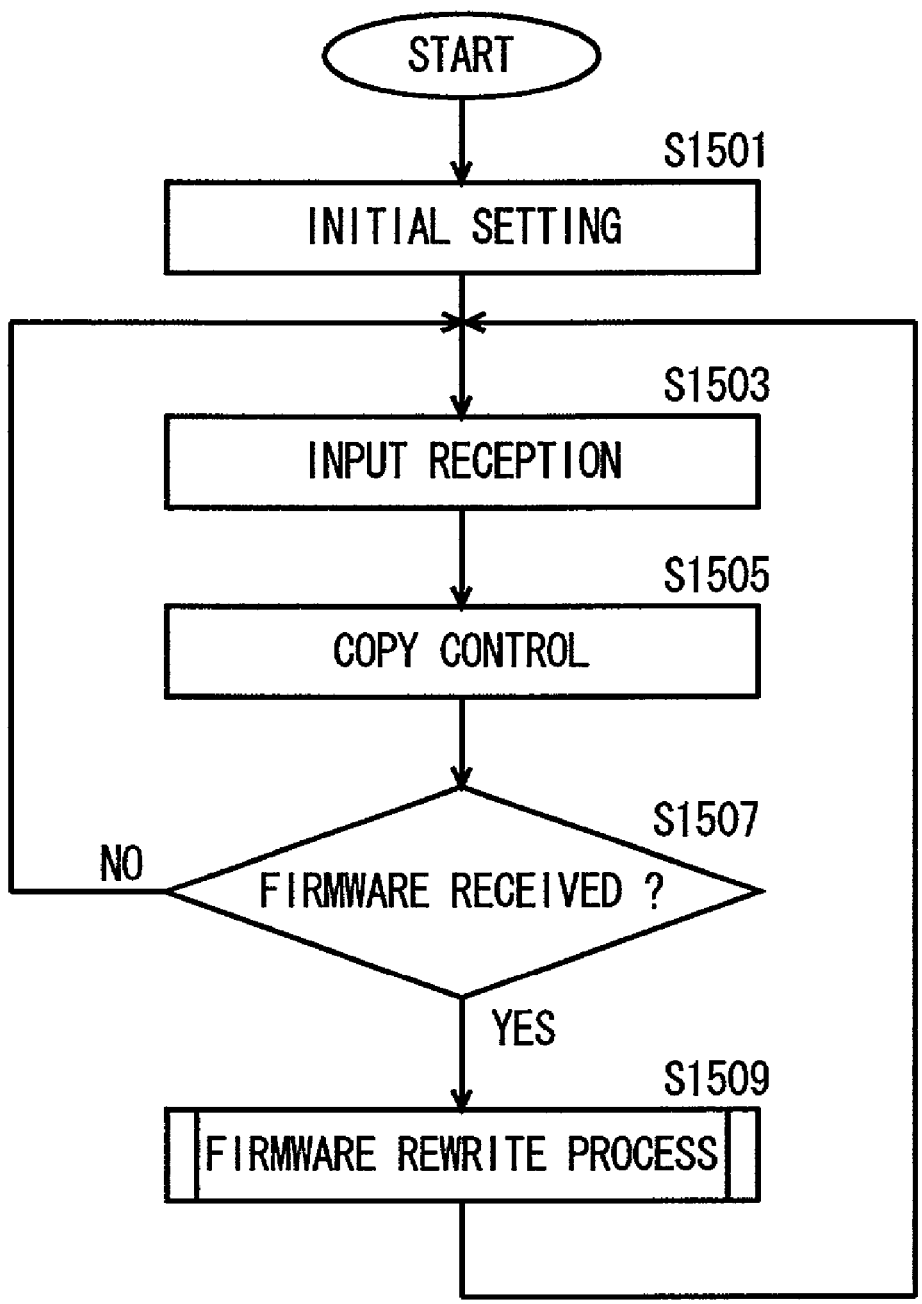
FIG. 15 is a flow chart of the basic process of image formation apparatus 11.

The process carried out at image formation apparatus 11 will be described here with reference to the flow chart of the basic process of FIG. 15. The basic process is executed by CPU 101 of image formation apparatus 11. Image formation apparatus 11 commences the process by having power turned on. Initial setting such as clearing the memory and setting the standard mode is carried out at each control module (step S1501). Then, an input reception process (step S1503) and a copy control process (step S1505) are repeatedly executed until a firmware reception notification is issued from printer controller 21.

At step S1503, reception of various input signals is carried out at one time. Here, the input signal includes an input signal from the key switch group on operation panel 118 of image formation apparatus 11, or from various sensor groups in the apparatus, a print job transmitted from printer controller 21, or a firmware reception notification.

At step S1505, a copy control process, i.e., a process required for operation of image formation apparatus 11, is carried out. This process includes, for example, control of various operation units such as sheet feed control, scanning control, photoreceptor drum control, developer control and the like, or a process according to a print job from printer controller 21.

When firmware reception notification is issued from printer controller 21 (YES at step S1507), control proceeds to step S1509 to carry out a firmware rewrite process. When the firmware rewrite process ends, control returns to step S1503. The process of step S1503 and step S1505 is repeated until a firmware reception notification is received again.

A firmware rewrite process of image formation apparatus 11 will be described here. First, the firmware and the number of the target control module transmitted from printer controller 21 via serial I/F 205 is received by CPU 11 through serial I/F 117 of image formation apparatus 11. Upon reception of firmware at CPU 111, the flash ROM in the target control module of the received firmware is rewritten according to the process set forth below.

Figure 16:
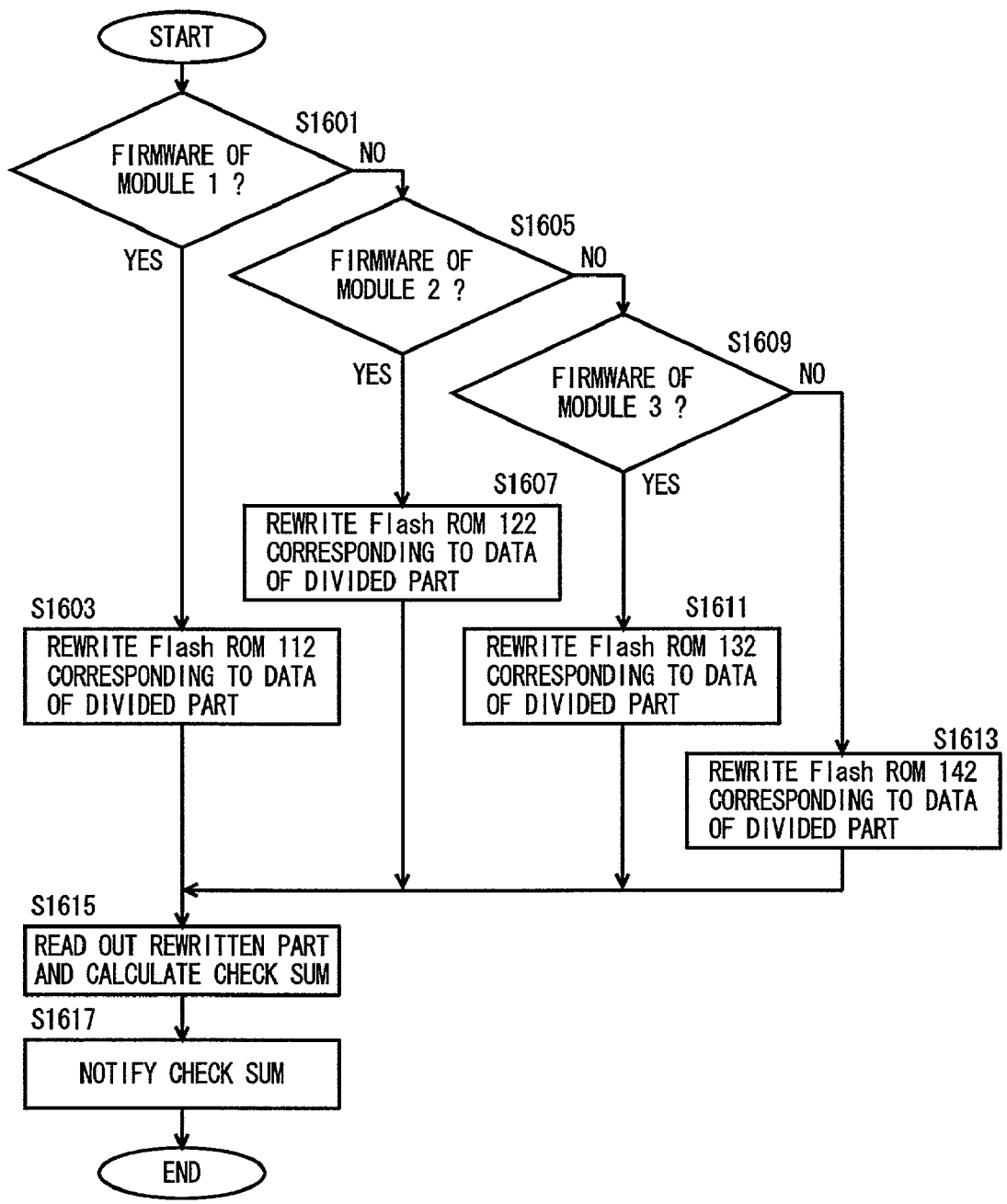
FIG. 16 is a flow chart of the details of a firmware rewrite process (step S1509 of FIG. 15) of image formation apparatus 11.

FIG. 16 is a flow chart of the details of a firmware rewrite process (step S1509 of FIG. 15) in image formation apparatus 11. This process is executed at CPU 101. First, determination is made of which of control modules 1-4 the received firmware corresponds to by steps S1601, S1605 and S1609.

When determination is made that the firmware corresponds to control module 1 (YES at step S1601, control proceeds to step S1603 where the data of the divided part is written into a corresponding region in flash ROM 112. Upon completion of the partial writing into flash ROM 112, control proceeds to step S1615.

When determination is made that the received firmware corresponds to control module 2 (YES at step S1605), the firmware is transferred from CPU 111 to CPU 121 of control module 2. At step S1607, the firmware is written into flash ROM 112. Upon completion of writing into flash ROM 122, control proceeds to step S1615.

When determination is made that the received firmware corresponds to control module 3 (YES at step S1609), the firmware is transferred from CPU 111 to CPU 131 of control module 3. At step S1611, the firmware is written into flash ROM 132. Upon completion of writing into flash ROM 132, control proceeds to step S1615.

When determination is made that the received firmware corresponds to control module 4 (NO at step S1609), the firmware is passed from CPU 111 through CPU 121 to CPU 141 of control module 4. At step S1613, the firmware is written into flash ROM 142. Upon completion of writing into flash ROM 142, control proceeds to step S1615.

At step S1615, the contents of the rewritten region in the target flash ROM is read out, and a check sum is calculated. At step S1617, the value of the calculated check sum is transmitted to printer controller 21 via serial I/F 117. Thus, a firmware rewrite process ends.

Figure 17:
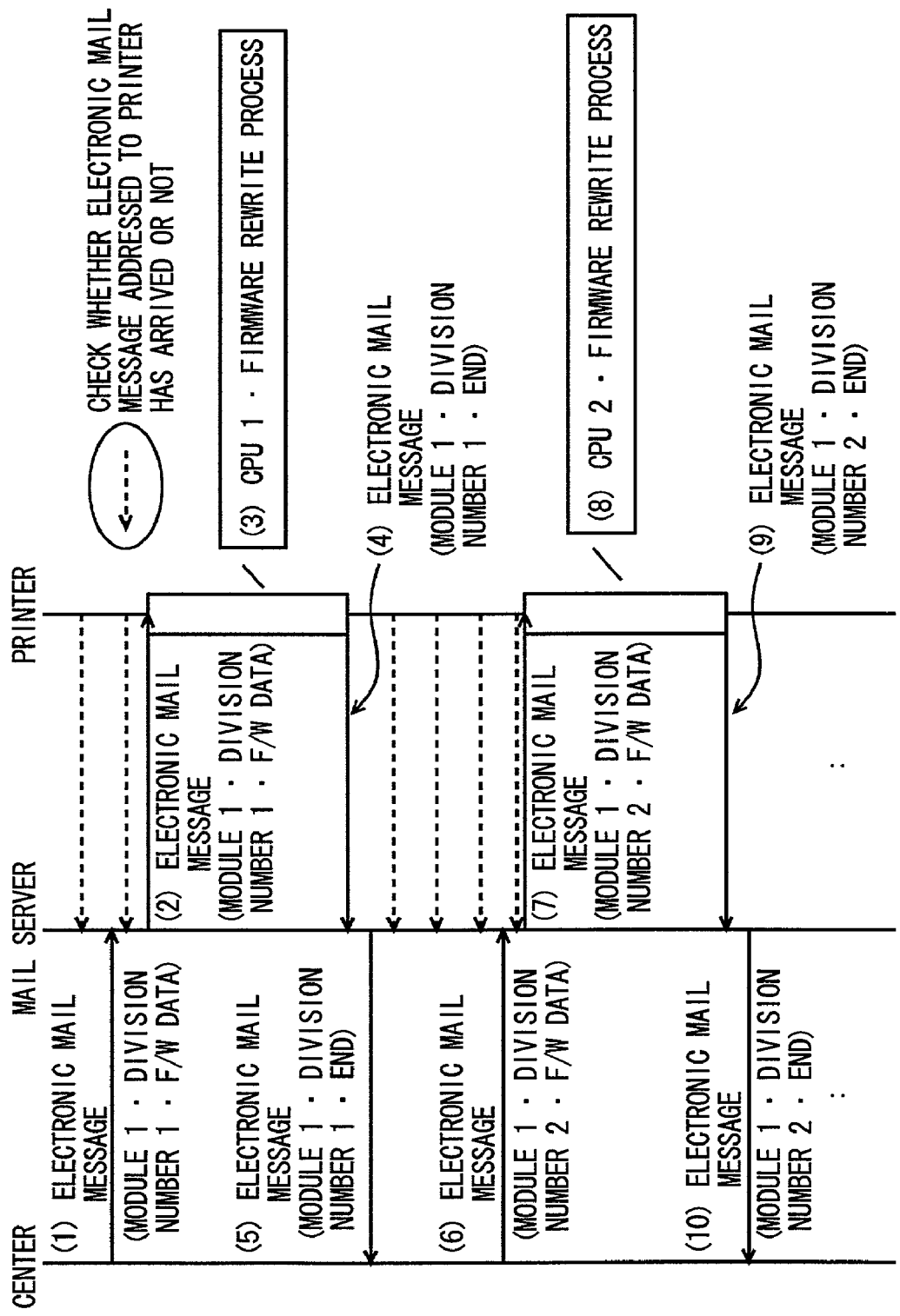
FIG. 17 is a diagram to describe the flow of each process of computer 91 of the service center side, mail servers 83 and 33, and image formation apparatus (printer) 11 of the user side.

The flow of each process of computer 91 at the service center side, mail servers 83 and 33, and image formation apparatus (printer) 11 of the user side will be described in time series with reference to FIG. 17. In FIG. 17, computer 91, mail servers 83 and 33, and image formation apparatus 11 are indicated in order from the left. It is assumed that the time axis is directed downwards.

Referring to FIG. 17, the firmware of division number 1 of module 1 is transmitted towards image formation apparatus 11 from computer 91 of the service center side (1). Image formation apparatus 11 checks whether new mail has arrived at mail server 33 at every constant period of time (arrow in dotted line). When new mail has arrived, that electronic mail message is downloaded at the image formation apparatus 11 side (2). Then, the firmware of the corresponding region is rewritten (3).

Upon completion of rewriting, the result is returned towards computer 91 as electronic mail (4). Computer 91 receives the rewrite result (5), and becomes aware that electronic mail of a large size can be transmitted again. The next divided firmware to be transmitted is determined. According to the contents of the determined firmware, the firmware data of the next division number is attached to electronic mail, and the electronic mail is transmitted towards image formation apparatus 1 (6).

When image formation apparatus 11 becomes aware of the presence of new mail addressed to itself at mail server 33, image formation apparatus 11 downloads the new mail (7). Then, the firmware rewrite process is carried out (8). The rewrite result is transmitted to computer 91 as electronic mail (9). Computer 91 receives the returned electronic mail (10), and becomes aware of an electronic mail transmissible state.

Thus, data communication can be effected properly by the data communication method (firmware communication method) of the present embodiment even in the case where the size of the firmware is so large that it exceeds the restricted size set at the mail server.

In other words, the oversize firmware is appropriately divided and attached to electronic mail. The electronic mail with the divided firmware attached is sequentially transmitted after a rewrite end notification is issued from the image formation apparatus that is the transmission destination. Therefore, the event of divided firmware being transmitted simultaneously to result in disabled transmission due to exceeding the size set at each mail account of the mail server can be circumvented.

In the case where information indicating that rewriting has failed sent from the other party is acquired, the same one firmware identical to the previously transmitted one is transmitted again. Therefore, the other party that has failed in rewriting can carry out a rewrite process again.

Here, description has been provided on the case where firmware is divided based on the restricted size set at the mail server and attached to electronic mail to be sequentially transmitted. Every time electronic mail is received, firmware is rewritten at the image formation apparatus. Therefore, the divided firmware is generally smaller than each module unit, and the firmware of the relevant region is rewritten at each time. Rewriting can be effected on a module-by-module basis by another method. A firmware rewrite process on a module-by-module basis will be described hereinafter with reference to FIGS. 18-20.

Figure 18:
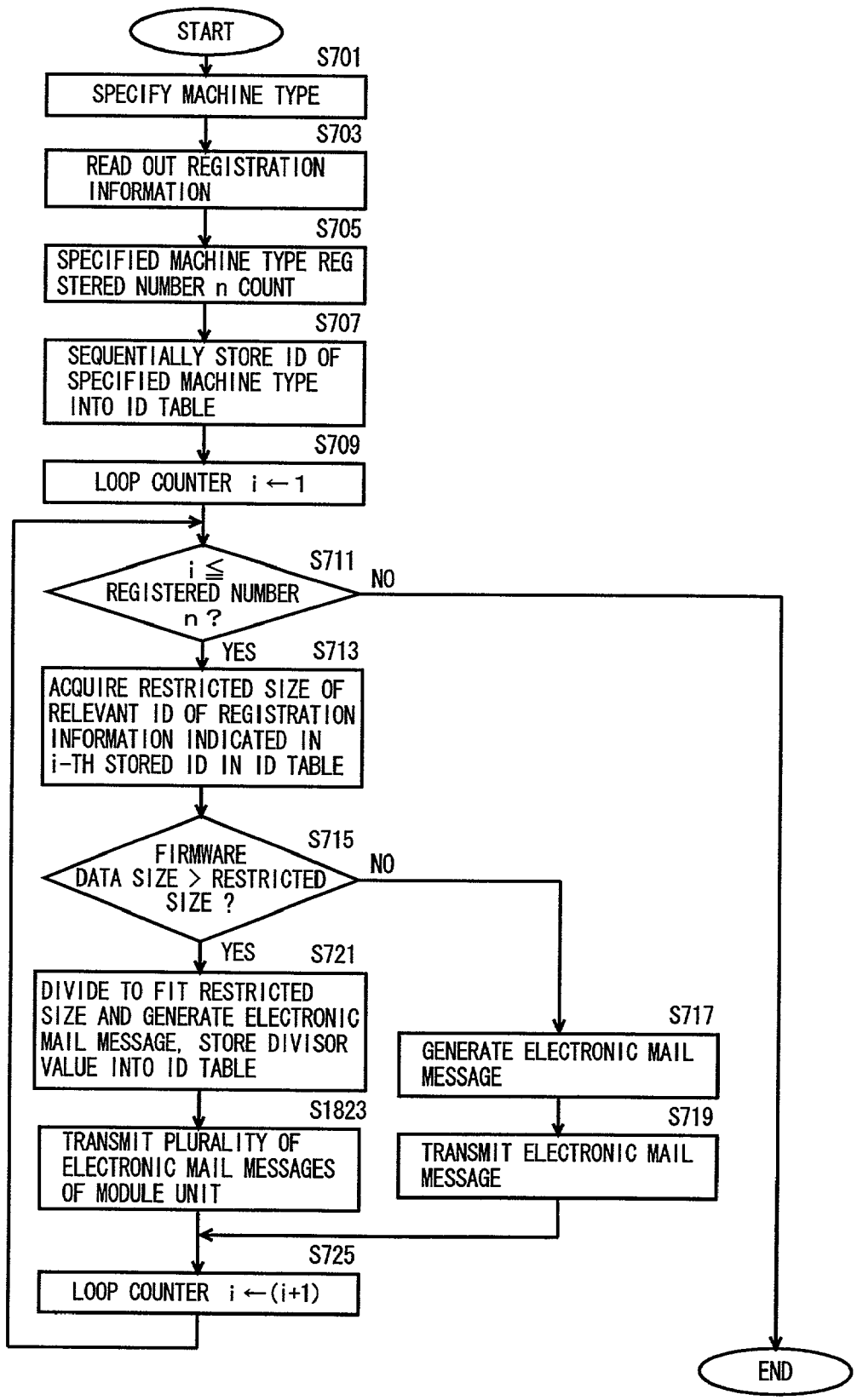
FIG. 18 is a flow chart of a firmware rewrite process carried out on a module-by-module basis.

FIG. 18 is a flow chart of a rewrite process of firmware carried out on a module-by-module basis. The flow chart of FIG. 18 is similar to the flow chart of FIG. 7 showing the details of a firmware transmission process (step S513) of FIG. 5. It is to be noted that the process of step S1823 is carried out instead of step S723 in FIG. 7.

Specifically, in the process of FIG. 7, one of a plurality of appropriately divided firmware is attached to electronic mail and transmitted to an image formation apparatus. Alternatively, a plurality of divided firmware corresponding to one module can be sequentially transmitted instead of only one divided firmware in order to rewrite firmware on a module-by-module basis.

Figure 19:
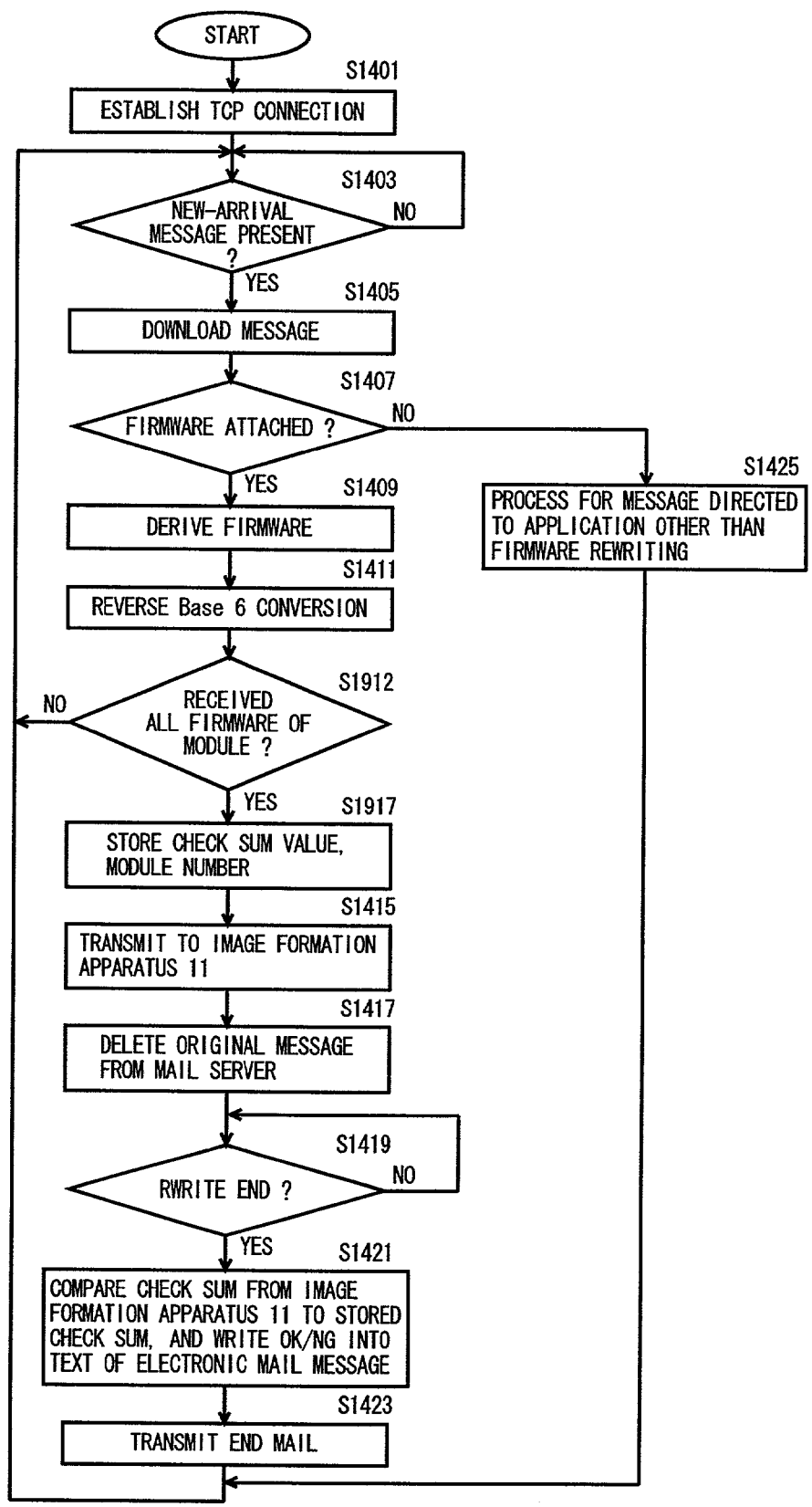
FIG. 19 is a flow chart of the details of a firmware read out process (step S1309 of FIG. 13) of a printer controller when firmware is rewritten on a module-by-module basis.

Therefore, the process carried out at the image formation apparatus (printer controller) at the user side receiving a plurality of divided firmware corresponding to one module slightly differs from that shown in FIG. 14. FIG. 19 is a flow chart of the details of a firmware read out process (step S1309 of FIG. 13) at the printer controller when firmware is rewritten on a module-by-module basis.

Before firmware is transmitted to an image formation apparatus at step S1415, waiting is conducted until all of a plurality of divided firmware corresponding to one module has been sent (step S1912). When all the plurality of divided firmware has been received, a check sum is calculated as one module (step S1917). The firmware is transmitted to an image formation apparatus together with the calculated check sum value (step S1415).

Figure 20:
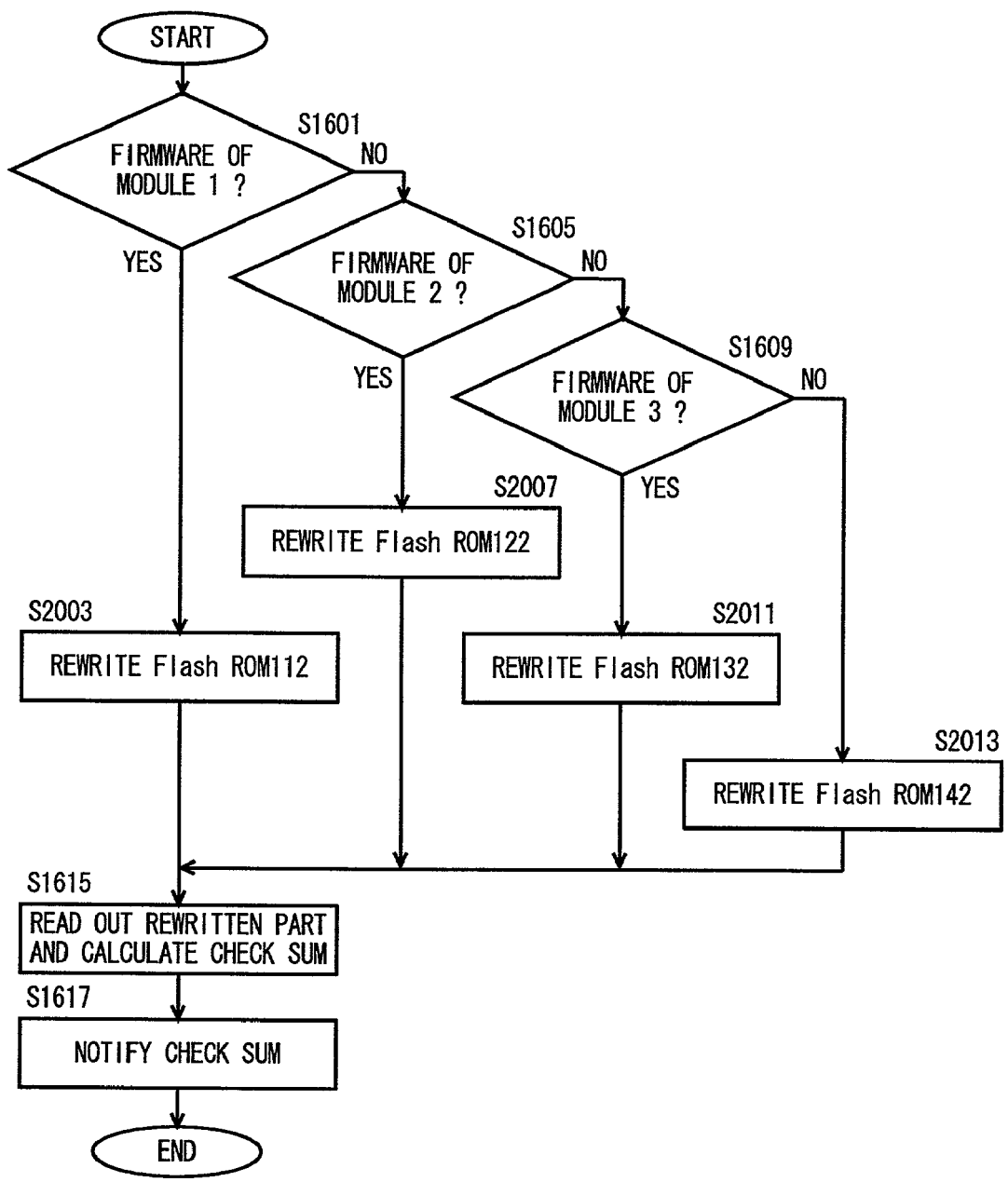
FIG. 20 is a flow chart of a firmware rewrite process carried out on a module-by-module basis at image formation apparatus 11.

A firmware rewrite process at image formation apparatus 11 receiving firmware data transmitted on a module-by-module basis will be described with reference to the flow chart of FIG. 20. First, determination is made of which of module the transmitted firmware corresponds to (steps S1601, S1605, S1609), similar to the process of FIG. 16.

According to the determination result, the firmware of the flash ROM of the corresponding module is rewritten (steps S2003, S2007, S2011, S2013). Therefore, regarding the calculation of the check sum at step S1615, the check sum for the firmware on a module-by-module basis is obtained. At step S1421 of FIG. 19, comparison of the check sum calculated on a module-by-module basis is carried out to determine whether firmware rewriting has succeeded or not.

By carrying out firmware rewriting on a module-by-module basis at one time, the total period of time from the start to the end of rewriting firmware for one module will be shortened. Also, administration of which region in the flash ROM is to be rewritten is no longer required. The process can be simplified.

Since the next firmware is attached to electronic mail to be transmitted only after the firmware transmission source is notified of the previous firmware write result from the image formation apparatus in the case where an image formation apparatus is formed of a plurality of control modules and transfer/transmission of firmware between each control module is relatively time consuming, firmware can be transmitted conforming to the operation of the image formation apparatus.

In the drawings (FIG. 1 and the like), the printer controller and image formation apparatus are illustrated as separate apparatuses. Alternatively, an integral structure with the function of a printer controller incorporated in an image formation apparatus can be employed. In this case, the printer controller and control module 1 execute a process while establishing liaison with each other. Also, the control implemented by CPU 101 can be executed by CPU 201 of the printer controller.

The present invention is described based on an image formation apparatus as the data communication apparatus having firmware that is to be rewritten. However, the present invention is not limited thereto. The present invention is applicable to any device that has communication capability such as a hub or router.

In the present invention, division of firmware is not limited to the case where single firmware is divided. The present invention includes the case where plurality of firmware that are to be transmitted are divided into a plurality of parts according to a predetermined condition.

The firmware rewrite result (rewrite end information) was described based on the case where the result is returned using electronic mail. However, the result can be returned using another method instead of an electronic mail system.

The firmware communication method (data communication method) carried out by image formation apparatus 11, computer 91 and printer controller 21 can be realized by a program directed to performing the above-described series of process. The data communication program may be pre-installed in respective hard disks of image formation apparatus 1, computer 91, and printer controller 21. Alternatively, the data communication program may be recorded onto a detachable recording medium such as a CD-ROM or a magnetic tape. In any event, the data communication program is recorded in a computer-readable recording medium.

The computer-readable recording medium includes a tape type such as a magnetic tape or cassette tape, a disk type such as a magnetic disk (flexible disk, hard disk device and the like) or an optical disk (CD-ROM/magneto-optical disk/DVD and the like), a card type such as an IC card (including memory card) or optical card, or a medium that retains a program in a non-volatile manner such as a semiconductor, for example, a ROM, EPROM, EEPROM, and flash ROM.

In the present specification, a program product includes a computer program. The program product may also include a recording medium in which a computer program is recorded. The contents stored in the recording medium is not limited to a program, and may include data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A computer-readable medium encoded with a computer program for data communication which causes a computer to execute:

a divide step of dividing firmware into a plurality of parts, a first transmission step of attaching one of said plurality of divided firmware parts to electronic mail and transmitting said electronic mail to an addressee, an acquirement step of acquiring information relating to a firmware rewrite result sent from the addressee acquiring said one firmware part attached to electronic mail, and a second transmission step of attaching another firmware part differing from said one of plurality of divided firmware parts to electronic mail and transmitting said electronic mail to the addressee when the information relating to said acquired rewrite result is information of success in rewriting.

2. The computer-readable medium according to claim 1, wherein said second transmission step transmits again said one of the plurality of divided firmware parts transmitted at said first transmission step when said information related to a rewrite result acquired at said acquirement step is information of failure in rewriting.

3. The computer-readable medium according to claim 1, wherein said second transmission step and said acquirement step are repeated for a predetermined number of times until the entire firmware is transmitted.

4. A computer-readable medium encoded with a computer program for data communication which causes a computer to execute:

a reception step of receiving electronic mail with one of a plurality of divided firmware parts attached, a derive step of deriving said firmware part from said received electronic mail, a write step of writing said derived firmware part into a predetermined memory, a determination step of determining whether writing into the memory at said write step has succeeded or not, which includes the following steps:

calculating a first check sum of said derived firmware part before said firmware part is written by said write step, calculating a second check sum of said written firmware part after said firmware part has been written by said write step, and comparing said first check sum to said second check sum, wherein a determination is made that writing has succeeded or failed when a comparison result by said comparison step indicates a match or a mismatch, respectively, and a notification step of notifying a transmission source of said electronic mail a determination result by said determination step.

5. A data communication apparatus comprising one or more circuits that perform the following functions:

dividing firmware into a plurality of parts, attaching one of said plurality of divided firmware parts to electronic mail and transmitting said electronic mail to an addressee, acquiring information relating to a firmware rewrite result sent from the addressee acquiring said one firmware part attached to electronic mail, and attaching another firmware part differing from said one of said plurality of divided firmware parts to electronic mail and transmitting said electronic mail to the addressee when said acquired information relating to a rewrite result is information of success in rewriting.

6. A data communication apparatus comprising one or more circuits that perform the following functions:

receiving electronic mail with one of a plurality of divided firmware parts attached, deriving said firmware part from said received electronic mail, writing said derived firmware part into a predetermined memory, determining whether writing into a memory by said writing portion has succeeded or not, by calculating a first check sum of said derived firmware part before said firmware part is written, calculating a second check sum of said written firmware part after said firmware part has been written, comparing said first check sum to said second check sum, and determining that writing has succeeded or failed when a comparison result indicates a match or a mismatch, respectively, and notifying a transmission source of said electronic mail of the result of said determination.

7. An image formation apparatus comprising a data communication apparatus defined in claim 6.

8. A data communication method comprising:

a divide step of dividing firmware into a plurality of parts, a first transmission step of attaching one of said plurality of divided firmware parts to electronic mail and transmitting said electronic mail to an addressee, an acquirement step of acquiring information relating to a firmware rewrite result sent from the addressee acquiring said one firmware part attached to electronic mail, and a second transmission step of attaching another firmware part differing from said one of said plurality of divided firmware parts to electronic mail and transmitting said electronic mail to the addressee when the acquired information relating to a rewrite result is information of success in rewriting.

9. A data communication method comprising:

a reception step of receiving electronic mail with one of a plurality of divided firmware parts attached, a derive step of deriving said firmware part from said received electronic mail, a write step of writing said derived firmware part into a predetermined memory, a determination step of determining whether writing into a memory at said write step has succeeded or not, which includes the following steps:

calculating a first check sum of said derived firmware part before said firmware part is written by said write step, calculating a second check sum of said written firmware part after said firmware part has been written by said write step, and comparing said first check sum to said second check sum, wherein a determination is made that writing has succeeded or failed when a comparison result by said comparison step indicates a match or a mismatch, respectively, and a notification step of notifying a transmission source of said electronic mail a determination result by said determination step.

* * * * *